United States Patent
Huang et al.

(10) Patent No.: US 9,501,447 B2
(45) Date of Patent: *Nov. 22, 2016

(54) SECURE HANDLE FOR INTRA- AND INTER-PROCESSOR COMMUNICATIONS

(71) Applicant: III Holdings 1, LLC, Wilmington, DE (US)

(72) Inventors: Kaiyuan Huang, Ottawa (CA); Michael F. Kemp, Ottawa (CA); Ernst Munter, Ottawa (CA)

(73) Assignee: III HOLDINGS 1, LLC, Wilmington, DE (US)

( * ) Notice: Subject to any disclaimer, the term of this patent is extended or adjusted under 35 U.S.C. 154(b) by 160 days.

This patent is subject to a terminal disclaimer.

(21) Appl. No.: 14/107,913

(22) Filed: Dec. 16, 2013

(65) Prior Publication Data

US 2014/0108636 A1    Apr. 17, 2014

Related U.S. Application Data

(63) Continuation of application No. 11/761,865, filed on Jun. 12, 2007, now Pat. No. 8,631,106.

(60) Provisional application No. 60/805,193, filed on Jun. 19, 2006.

(51) Int. Cl.
*G06F 15/173* (2006.01)
*H04L 1/16* (2006.01)

(52) U.S. Cl.
CPC .......... *G06F 15/173* (2013.01); *H04L 1/1614* (2013.01); *H04L 1/1685* (2013.01)

(58) Field of Classification Search
None
See application file for complete search history.

(56) References Cited

U.S. PATENT DOCUMENTS

| 5,617,537 | A | * | 4/1997 | Yamada et al. | 709/214 |
| 5,999,988 | A | * | 12/1999 | Pelegri-Llopart et al. | 719/330 |
| 8,631,106 | B2 | * | 1/2014 | Huang et al. | 709/223 |
| 2004/0064692 | A1 | * | 4/2004 | Kahn et al. | 713/167 |
| 2007/0234330 | A1 | * | 10/2007 | Field | 717/165 |

* cited by examiner

*Primary Examiner* — John B Walsh
(74) *Attorney, Agent, or Firm* — Brundidge & Stanger, P.C.

(57) ABSTRACT

A protocol element referred to as a secure handle is described which provides an efficient and reliable method for application-to-application signaling in multi-process and multi-computer environments. The secure handle includes an absolute memory reference which allows the kernel to more quickly and efficiently associate a network data packet with an application's communication context in the kernel.

15 Claims, 22 Drawing Sheets

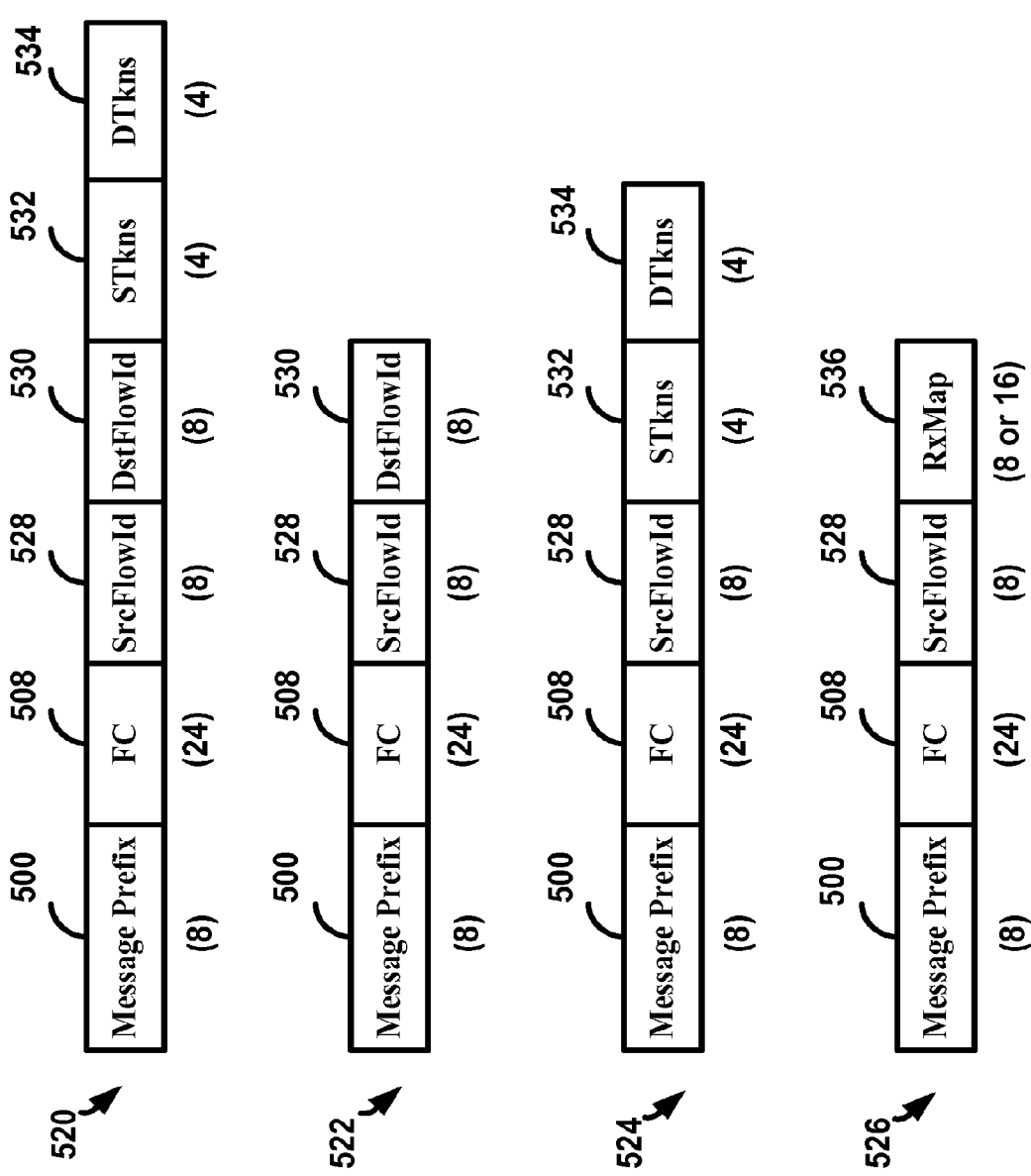

```
// local variables
bool    bitmap[];              // bitmap, initially empty
int     LDestSeq;              // copy of last consecutive srcSeq received
int     highestDestSeq;        // copy of highest srcSeq received
int     LSourceSeq;            // copy of last srcSeq sent
Timer   lossTimer;             // timer to detect absence of received packets
Queue   SendQueue;             // queue of packet to be sent
``` int     highestAck;           // last consecutive packet acknowledged
Timer SendTimer;              // timer to force retransmission
Queue RetransmitQueue;        // queue of packets to be retransmitted

```
// constants
maxLossDistance;               // within the range of the bitmap
maxLossTime;                   // time before forcing update map message // list of function prototypes
function ReceivePacket(packet);
function SendAcknowledge(packet_header);
function TimerExpires(maxLossTimer);
function SendCtl(messageType, ...);
function SendData(...);
```
function ReceiveAcknowledge (int lastAck);
function ReceiveAcknowledgeUpdate(bool receivedBitmap[]);
function TimerExpires(SendTimer);
```
// other functions may be provided by standard libraries or the operating system // Function Implementations:

// The reception of a packet requires acknowledgement of the packet itself
as well as reaction to acknowledgements from the other end in the packet header
and payload.
function ReceivePacket(packet)
{
        ReceiveAcknowledge (packet.header.dstSeq);

if (packet contains Update Map control message)
        {
                ReceiveAcknowledgeUpdate(packet.payload.RxMap);
        } if (packet.header.cat = 1)
// case of normal data packet that is part of a flow
        {
                SendAcknowledge(packet.header);
        }
}
```

FIG. 11A

```
// Normal packet acknowledgement
function SendAcknowledge(packet_header)
{
        if (packet_header.srcSeq == LDestSeq+1)
// case of next expected sequence number
        {
// record reception of the packet
                bitmap[packet_header.srcSeq] = true;

LDestSeq = packet_header.srcSeq;
                highestDestSeq = packet_header.srcSeq;
                Start(lossTimer);
        } else
// case of non-consecutive sequence numbers
        {
                if (bitmap[packet_header.srcSeq])
// case of duplicate number, i.e. duplicate packet received
                {
                        SendCtl(UpdateMapMsg,LDestSeq,LSourceSeq,bitmap);
                } else if (packet_header.srcSeq > highestDestSeq)
// case of skipped number, i.e. earlier packet has not been received
                {
                        highestDestSeq = packet_header.srcSeq;

// record the reception of this packet
                bitmap[packet_header.srcSeq] = true;

if (packet_header.srcSeq-LDestSeq > maxLossDistance)
// maximum loss distance exceeded: urgent retransmission required
                        {
                                Send(UpdateMapMsg,LDestSeq,LSourceSeq,bitmap);
                        }
                } else
// case of earlier out-of-order packet
                {

// record the reception of this earlier packet
                bitmap[packet_header.srcSeq] = true;

int nz = CountZeros(bitmap,highestDestSeq);
// nz is the number of zeros in the bitmap up to highestDestSeq
// nz is thus the number of missing earlier packets if (nz == 0) // this indicates there no earlier packets missing
                                {
                                        LDestSeq = packet_header.srcSeq ;
                                        highestDestSeq = packet_header.srcSeq;
                                        Start(lossTimer);
                                }
                }
        }
}
```

FIG. 11B

```
// If immediate Ack is requested then an update map control message will be sent
// unless another message is already (or still) in the send queue
        if (packet_header.AckIm && SendQueue = empty)
        {
                SendCtl(UpdateMapMsg,LDestSeq,LSourceSeq,bitmap);
        }
}

// If the loss timer expires, an update map control is sent
function TimerExpires(maxLossTimer)
{
        SendCtl(UpdateMapMsg,LDestSeq,LSourceSeq,bitmap);
}
function SendCtl(messageType, ...)
{
        Construct the packet(messageType, ...);

// the current local sequence numbers are
// are copied into the header of the packet:
        packet.packetHeader.srcSeq = LSourceSeq;
        packet.packetHeader.dstSeq = LDestSeq;

Enqueue(SendQueue,packet);
}
function SendData(...)
{
        Construct the packet(...);

// increment the sequence number
        LSourceSeq = LSourceSeq + 1;

// the current local sequence numbers are
// are copied into the header of the packet:
        packet.packetHeader.srcSeq = LSourceSeq;
        packet.packetHeader.dstSeq = LDestSeq;

Enqueue(SendQueue,packet);

Enqueue(RetransmitQueue,packet);
}
function ReceiveAcknowledge (int lastAck)
{
        for (packet_id = highestAck+1 to LSourceSeq)
        {
                packet = Find(RetransmitQueue, packet_id);
                if (packet exists)
                {
                        Remove(RetransmitQueue, packet);
                }
        }
// update highest acknowledged sequence number
        highestAck = lastAck;
}
```

FIG. 11C

```
// Scan through the received bitmap to resend (0) or acknowledge (1)
function ReceiveAcknowledgeUpdate(bool receivedBitmap[])
{
        for (packet_id = highestAck+1 to LSourceSeq)
        {
                packet = Find(RetransmitQueue, packet_id);
                if (packet exists)
                {
                        if (receivedBitmap[packet_id] == false)
                        {
                                Enqueue(SendQueue, packet);
                        }
                        else
                        {
                                Remove(RetransmitQueue, packet);
                        }
                }
        }
}

// Note that simple resending of a packet does not increment the source sequence
number.

// If the send timer expires, retransmit the first packet of the retransmit queue
// and ask for immediate acknowledgement (AckIm).
function TimerExpires(SendTimer)
{
        Start(SendTimer); //restart immediately packet = Head(RetransmitQueue);
        if (packet exists)
        {
                packet.header.AckIm=1;

Enqueue(SendQueue, packet);
        }
}
```

FIG. 11D

SECURE HANDLE FOR INTRA- AND INTER-PROCESSOR COMMUNICATIONS

This application is a continuation of and claims priority to U.S. patent application Ser. No. 11/761,865, filed Jun. 12, 2007, and in turn claims the benefit of priority under 35 U.S.C §1.19(e), to provisional application Ser. No. 60/805,193, filed Jun. 19, 2006, which application is hereby incorporated herein by reference in its entirety. This application is related in subject matter to three commonly assigned applications, the first identified as U.S. Pat. No. 7,664,026, issued Feb. 16, 2010, the second identified as U.S. Pat. No. 7,908,372, issued Mar. 15, 2011 and the third identified as U.S. application Ser. No. 11/761,885, now abandoned, which all are incorporated herein by reference in their entireties.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings referred to herein: Copyright 2006, Liquid Computing, Inc., All Rights Reserved.

BACKGROUND OF THE INVENTION

Field of the Invention

Embodiments of the present invention relate to methods and systems for efficiently sending data between the computers in a high performance computer network. More specifically, the embodiments of the present invention relate to methods and systems for linking distributed multi-processor applications and distributed shared memory subsystems.

Description of the Related Information

Communication between software entities (applications) on different host computers is frequently carried in packets over standard transmission protocols, such as TCP. Many application programs may be running concurrently on each computer, and methods have been developed to allow such programs to communicate independently. The operating system in each computer, specifically the part of the operating system referred to as the "operating system kernel" or "kernel", has the task of managing the processes under which the application programs run. The kernel also provides the communications services for the entire computer: it mediates between the application programs and the hardware such as Ethernet interfaces that provide the circuitry for receiving and sending data packets. An example of an operating system so structured is LINUX, as discussed in *Distributed Shared Memory Programming*, by Tarek El-Ghazwi et al., John Wiley & Sons, 2005, ISBN 0-471-22048-5, which is hereby incorporated by reference in its entirety.

In a system such as a massively parallel multi-processor system, or "super computer," a large number of communication paths may be required to carry data from the memory of one computer to the memory or CPU of another. A common example of a distributed application in which such data communication occurs is the computation of certain mathematical algorithms such as matrix multiplication. This may involve many computers with each computer having a data communication path established with many or all of the other computers.

A method of programming a super computer is based on the UPC (Unified Parallel C) programming language, which provides programmers with the capability to write a program that will run on the multiple CPUs of a super computer while using the memory units of the CPUs as a shared distributed memory. To effectively share the memory, the CPUs are connected through a data network that may be based on TCP or a proprietary protocol. TCP may be selected because it is a widely available and standard connection oriented protocol. Conventionally, each CPU includes an application environment (application space) and an operating system environment (kernel space). For one CPU to access the memory of another then requires a data communications path to be set up, e.g. a TCP connection.

FIG. 1 illustrates an exemplary and conventional multi-processor system 10 comprising a number of CPUs (CPU1 12 and CPUn 14 only shown) and a network 16. The CPUs may contain many hardware and software components, but only few are illustrated here to briefly describe the role of inter-processor communication. The CPU1 (12) includes a memory 20, an application 22, a socket 24, a kernel 26, and a packet interface 28. The CPUn (14) similarly includes a memory 30, an application 32, a socket 34, a kernel 36, and a packet interface 38.

For example, the application 22 in the CPU1 (12) may have set up a data connection 40 between the socket 24 and the socket 34 in the CPUn (14). The applications 22 and 32 may have been compiled with the UPC programming language and the applications 22 and 32 may be copies of the same program running independently in the two CPUs 12 and 14. Through the sockets 24 and 34, the applications 22 and 24 are then able to exchange data over the data connection 40.

The data connection 40 may be carried in a standard TCP connection established between the kernels 26 and 36 in the respective CPUs over the corresponding packet interfaces 28 and 38. The packet interfaces 28 and 38 may be Ethernet interfaces, and the network 16 provides the physical connection between the packet interfaces 28 and 38 in a known manner.

The sockets 24 and 34 provide the software interface between the application 22 and the kernel 26, and between the application 32 and the kernel 36, respectively. They further provide the application 22 and the application 32 with a virtual connection representation regardless of the underlying protocols and physical networking facilities used.

In this way, the application 22 is able to read data from the memory 30 that is associated with the application 32 in the CPUn (14), when required by the program. Note that such read operation may require protocol support at the CPUn (14). It may be recognized that this method for the application 22 to read data from the memory 30 may be cumbersome, especially when large amounts of data have to be shared by applications. The application program may have to wait frequently as a result of the delay in obtaining data from a memory on a different CPU, the delay being a combination of the transmission delay through the network and the processing delays in each CPU. Network and transmission delays are being improved by newer, higher speed technology. But the complexity of the existing kernel software that interfaces the packets to the applications is becoming a bottleneck in high performance computer systems.

In order to deliver the payload of a received packet to the intended application for example, the kernel needs to determine from the header of the received packet, the socket ID through which the application communicates with the kernel for each connection. The kernel can further determine the destination application through the information stored in the socket data structure. Where there are many processes, and potentially many open ports or sockets, this may involve a large number of instruction cycles in the kernel to scan or otherwise search the lists of sockets, in order to associate the correct destination (application) with each received packet before it can deliver the received packet data to the application.

FIG. 2 is a simplified flow chart 100 illustrating a typical method by which an application in a multi-process environment receives data from a data link using a data transport protocol such as TCP/IP. The flow chart 100 shows a kernel space 102 and an application space 104. Shown in the application space 104 are sequential steps 106 "Application Establishes Socket Connection" and 108 "Application Makes System Call (Receive)." A system call 110 links the step 108 "Application Makes System Call (Receive)" to a step 112 "Application Blocked, Waiting for Data" in the kernel space 102. A step 114 "Copy Data to Application Memory" in the kernel space 102 is linked by a "return" link 116 back to a step 118 "Application Processing Data" in the application space 104.

Also shown in the kernel space 102 are sequential steps:
120: "Packet Arrives from Network";
122: "Read Packet Header";
124: "Process Protocol Elements";
126: "Locate Destination Socket";
128: "Unblock Application"; and
130: "Reschedule Application."

Straddling the kernel space 102 and the application space 104 are a data structure 132 "Socket" and a data structure 134 "Application Data Memory." The steps 106 "Application Establishes Socket Connection," 108 "Application Makes System Call (Receive)", and 126 "Determine Data Destination in Application Memory", all access the data structure 132 "Socket." The data structure 134 "Application Data Memory" is accessed by the steps 128 "Copy Packet Payload to Destination" and 118 "Application Processing Data." In operation, the application 104 communicates with the kernel 102 through the ID of the Socket 132. The Socket 132 is a data structure that is managed by the kernel 102 and is associated with the process (not shown) under which the application 104 runs. The Socket 132 is created by the kernel 102 when the application 104 first requests and establishes packet communication with the remote end, and is subsequently used by the kernel 102 to link received packets back to the application 104. In the multi-process environment, the kernel may serve many sockets and many processes (applications) which may simultaneously be in a state of waiting for data.

FIG. 3 illustrates the format of a typical packet 140, having a packet header 142 and a packet payload 144. Information in the packet header 142 is, in a general sense, used to route the packet to the intended destination. The packet payload 144 is destined for the Application Data Memory 134 (FIG. 2) of the receiving application 104. The packet header 142 may be comprised of a number of sub-headers (not shown) to facilitate routing over a network to the intended destination computer (not shown) in the well known manner. When the packet 140 arrives at the destination computer (step 120 "Packet Arrives from Network") the information in the packet header 142 is then used by the kernel 102 to determine the final destination of the packet payload 144, i.e. the socket data structure for receiving the packet payload and eventually an application receive buffer in the Application Data Memory 134 of the application 104.

Continuing with the description of FIG. 2: when a packet arrives (the step 120 "Packet Arrives from Network"), the payload data of the packet will ultimately be copied into the Application Data Memory 134 by the kernel 102 (the step 114 "Copy Data to Application Memory"). This happens only after the destination application (104) has been rescheduled to run while the processor is still running in the kernel before returning to the user space.

The actions of the kernel 102 from the step 122 to the step 114 are as follows: In the steps 122 "Read Packet Header" and 124 "Process Protocol Elements" the header is parsed, i.e. relevant fields are extracted, and protocol specific data structures (not shown) are updated as defined by the protocol used. For example, the TCP protocol described in IETF-rfc793 (which is incorporated herein by reference in its entirety) requires numerous actions to be performed upon receipt of every packet. In the step 126 "Locate Destination Socket", the socket data structure of the target application is determined which, in turn, provides process and memory address information of the target application 104 for use in later steps. Port numbers and other information in the packet header 142 is used in the step 126 "Locate Destination Socket" to find the memory location of the socket data associated with the received packet. The process ID identifies the application that should receive the packet payload, and is determined from the Socket Data in the step 126 "Locate Destination Socket." The process ID leads to the process data structure which may be located by a lookup or a scan of a table of active process IDs. The process context, in the form of the Process Data Structure, is retrieved (see the step 112 "Application Blocked, Waiting for Data" in FIG. 2) in the step 128 "Unblock Application" and activated in the step 130 "Reschedule Application."

Restoring the process context of an application is commonly referred to as context switching. This happens when the concerned process is selected to run next. The major part of this is switching of the virtual address space (changing of paging table) if the kernel is not currently running in this process' virtual address space. Finally, in the step 114 "Copy Data to Application Memory", the kernel is ready to obtain the memory address for delivery of the packet payload into the application data memory 114 (FIG. 2).

FIG. 4 is an expansion of the steps 114 "Copy Data to Application Memory" from FIG. 2, into the following steps:
160 "Obtain Process ID from Socket Data Structure";
162 "Load Process Context";
164 "Get Destination Memory Address"; and
166 "Copy Data."

Having determined the destination address (step 164) by way of the Process ID and the Process Context (steps 160 and 162), the data contained in the packet payload 144 (FIG. 3) is stored (copied from the system buffer) into the Application Data Memory 134 in the final step 166 "Copy Data." Having delivered the data, the kernel 102 may immediately return (link 116) to the step 118 "Application Processing Data" in the application 104, i.e. giving up control to the application 104 running in user space (application space), unless it is preempted by another process or kernel thread of higher priority.

To summarize briefly, computer-to-computer (application-to-application) communication is based conventionally on an interface between the application and the operating system kernel, based on concepts of process or thread and socket. Within the application there is a procedural interface to send (write) and receive (read) on a socket. These are system calls which transfer control to the kernel. Within the kernel, a communications stack, for example TCP/IP, implements a packet protocol that is required to exchange data over a network. The major repetitive actions, after a connection has been established are:

Sending: the kernel determines the connection context represented by the socket data structure. However, only the socket ID, which has an ID space per process, is passed in the system call. The kernel first finds the process ID/process data structure of the current process on receiving the system call. From there it can further locate the socket data structure, in a sense the kernel locates the socket data structure from the socket ID plus the implicit process ID. The kernel then constructs a packet header and copies the application data into the packet payload and queues the packet for sending. Hardware then serves the queue and transmits the packet to the network.

Receiving: the hardware delivers a packet to the kernel; the kernel, after satisfying protocol requirements such as sending an acknowledgement, locates the socket data structure from the packet header. The identity of the destination process is then determined from the socket data structure. The process context then leads to the actual destination memory address in the application space as previously described, and the packet payload is copied there.

Conventional protocols such as TCP and kernel implementations of these provide the desired reliability, in terms of data communications integrity, and by separating the individual applications from the common system facilities. But it is clear that the amount of work in the kernel to handle each packet transmission at each end of a connection may lead to a significant inefficiency in terms of processing overhead.

More information about operating system kernels and the implementation of multi-process communications such as TCP/IP may be found in, for example, *TCP/IP Illustrated, Volume 1: The Protocols*, by W. Richard Stevens, Addison-Wesley, 1994, ISBN 0-201-63346-9; *Linux Kernel Development Second Edition* by Robert Love Novell Press, Jan. 12, 2005, Print ISBN-10: 0-672-32720-1, Print ISBN-13: 978-0-672-32720-9, and *TCP/IP Illustrated, Volume 2: The Implementation*, by Gary R. Wright, W. Richard Stevens, Addison Wesley Professional, Jan. 31, 1995, Print ISBN-10: 0-201-63354-X, Print ISBN-13: 978-0-201-63354-2, each of which are hereby incorporated by reference in their entirety. In the TCP/IP communications stack, TCP provides application level messaging in the form of a reliable connection oriented protocol with flow control while IP provides connectionless routing of packets, node to node.

The kernel running the communications stack and the applications share the same processors, consuming processor cycles. Any cycles consumed by the kernel to run the standard communications protocols (TCP/IP) and to interface with the applications are cycles that are lost to the applications. In a distributed computing environment such as the high performance computing (HPC) environment, application cycles are at a premium. At the same time, due to the distributed processing nature of the application, a large amount of inter-processor communication with low latency is required. The existing TCP/IP protocol suite for example, provides an elegant and standard method of routing many data streams concurrently. But even when implemented efficiently, it does not meet the super computer requirement of almost instantly placing data sent from an application on one processor into the memory space of an application on a different processor. There exists, therefore, a need for the development of an improved method and system to allow applications in a multi-computer environment to communicate more efficiently.

SUMMARY OF THE INVENTION

There is a need to develop an efficient and reliable data exchange method between computer applications and kernel code in a single computer, in a symmetric multiprocessor system (SMP), and in a distributed high performance computer system (HPC).

According to an embodiment of the present invention, this need is met by the provision of a secure context object handle. In one embodiment, the secure context object handle may be used to communicate more efficiently between an application and the kernel. Other embodiments of the present invention include a new protocol suite to replace TCP/IP in computer-to-computer communications.

An embodiment of the present invention is a method for communicating data messages according to a data communications protocol from a source computer to a destination computer, the destination computer including a memory having at least one application object stored in it at a context address. The method may include steps of providing the source computer with a context reference which includes the context address; sending from the source computer to the destination computer a data packet having a header which includes the context reference, and a payload data; receiving the data packet at the destination computer; extracting the context address from the context reference in the packet header; and storing the received payload data in the memory of the destination computer in accordance with the at least one application object.

According to further embodiments, the context reference may further include a sequence number and a signature. The sequence number may be a field having at least 8 (for example) distinct values. The signature may include a field having a value determined by the address and the sequence number of the context reference. The signature may be determined by, for example, XOR or CRC. The protocol may be a connection oriented protocol. The protocol may include TCP.

According to another embodiment thereof, the present invention is also a method of data communication between a first plurality of application processes running on a first computer and a second plurality of application processes running on a second computer. Such a method may include steps of establishing a tightly flow controlled packetized data connection from the first to the second computer according to a first protocol; establishing a plurality of loosely flow controlled packetized data connections between one of the first plurality of applications and one of the second plurality of applications, according to a second protocol; and sending data packets of one of the loosely flow controlled connections over the tightly flow controlled connection.

Still another embodiment of the present invention is a bit mapped selective retransmission method. For example, a method of reliably transmitting data packets from a first computer (source node) to a second computer (destination node) may include a step of sending data packets numbered with consecutive sequence numbers from the first computer to the second computer; retaining a copy of each sent data packet in a retransmit queue of said first computer; receiving the data packets in the second computer; tracking the sequence numbers of the data packets received in said second computer; sending an acknowledgement message for each received data packet from said second computer to said first computer; and sending a selective bitmap message where the bitmap indicates the reception status of the last N consecutively numbered data packets, only if at least one of the N (e.g., 8 or 16) data packets was not correctly received within a predetermined time.

Yet another embodiment of the present invention relates to controlling the flow of data packets from source to destination nodes. For example, an embodiment of the present invention may include a method of flow control in the transmission of data packets from one of a plurality of first computers (source nodes) to a second computer (destination node), the second computer having a shared intermediate buffer for receiving data packets, the shared intermediate buffer having space for a plurality of M data packets. The method may include steps of the destination node distributing tokens to each of the source nodes, a numerical quantity of tokens where each token represents an available buffer space, and the sum of the tokens that are distributed does not exceed M; each of the source nodes having a data packet to send, if the number of tokens available at said source node exceeds zero, sending the data packet and discarding one of the tokens, otherwise sending a token request message after a predetermined time; the destination node periodically distributing additional tokens to any of the source nodes that have sent data packets to the destination node; immediately distributing additional tokens to any of the source nodes that have depleted their tokens and have sent a token request message; and making the distribution of tokens conditional upon the availability of buffer space.

Accordingly, an embodiment of the present invention is a computer-implemented method for enabling communication of data from a kernel of an operating system to a client. The method may include steps of providing a context object that includes the data to be accessible to the client; providing the kernel with a secure object handle, the secure object handle including an address of the context object; sending the secure object handle from the kernel to the client over a bidirectional interface; receiving, from the client, the secure object handle from the client over the bidirectional interface, indicating that the client requires access to the data in the context object, and checking an integrity of the secure object handle in the kernel and allowing access to the data by the client if the integrity check is successful and disallowing access to the data by the client if the integrity check is unsuccessful.

The context object providing step may be carried out with the context object including a unique allocation stamp and the secure object handle may include a field configured to store a value of the allocation stamp. The secure object handle may include a signature and the secure handle integrity check may include a step of verifying the integrity of the signature. The context object providing step may be carried out with the context object including a unique allocation stamp. The secure object handle may include a field configured to store a value of the allocation stamp. The secure object handle may include a signature and the secure handle integrity check may include a step of verifying the integrity of the signature. The secure object handle providing step may include generating the signature as a predetermined function of a value of the unique allocation stamp and the address of the context object. When the integrity check is successful, the method further may include a step of the client accessing the data at the address of the context object in the received secure object handle. The signature integrity checking step may include a step of the kernel computing a temporary variable and comparing the computed temporary variable to the signature in the secure object handle received from the client and disallowing access to the data by the client if the computed temporary variable does not match the signature. The integrity checking step may include a step of disallowing access to the data by the client when the value of the allocation stamp in the secure object handle received from the client does not match the unique allocation stamp in the context object. The method may further include a step of making the data unavailable to the client by changing the unique allocation stamp. The secure object handle providing step may be carried out by incorporating at least the address of the context object and the signature in a header of a packet configured according to a predetermined communication protocol. The integrity checking step may include one or more Boolean Exclusive OR (XOR) operations. The integrity checking step may include a Cyclic Redundancy Check (CRC). Only the kernel may carry out the integrity checking step. The communication protocol may be a connection-oriented protocol such as TCP, for example.

According to another embodiment thereof, the present invention is a machine-readable medium having data stored thereon representing sequences of instructions which, when executed by a kernel of an operating system, causes the kernel to enable communication of data from the kernel to a client, by performing the steps of providing a context object that may include the data to be accessible to the client; providing the kernel with a secure object handle, the secure object handle including an address of the context object; sending the secure object handle from the kernel to the client over a bidirectional interface; receiving, from the client, the secure object handle from the client over the bidirectional interface, indicating that the client requires access to the data in the context object, and checking an integrity of the secure object handle in the kernel and allowing access to the data by the client if the integrity check is successful and disallowing access to the data by the client if the integrity check is unsuccessful.

The context object providing step may be carried out with the context object including a unique allocation stamp. The secure object handle may include a field configured to store a value of the allocation stamp. The secure object handle may include a signature and the secure handle integrity check may include a step of verifying the integrity of the signature. The context object providing step may be carried out with the context object including a unique allocation stamp. The secure object handle may include a field configured to store a value of the allocation stamp. The secure object handle may include a signature, and the secure handle integrity check may include a step of verifying the integrity of the signature. The secure object handle providing step may include generating the signature as a predetermined function of a value of the unique allocation stamp and the address of the context object. Then the integrity check is successful, the method further may include a step of the client accessing the data at the address of the context object in the received secure object handle. The signature integrity checking step may include a step of the kernel computing a temporary variable and comparing the computed temporary variable to the signature in the secure object handle received from the client and disallowing access to the data by the client if the computed temporary variable does not match the signature. The integrity checking step may include a step of disallowing access to the data by the client when the value of the allocation stamp in the secure object handle received from the client does not match the unique allocation stamp in the context object. The method may further include a step of making the data unavailable to the client by changing the unique allocation stamp. The secure object handle providing step may be carried out by incorporating at least the address of the context object and the signature in a header of a packet configured according to a predetermined communication protocol. The signature integrity checking step may include one or more Boolean Exclusive OR (XOR) operations. The signature integrity checking step may include a Cyclic Redundancy Check (CRC), for example. Only the kernel may carry out the signature integrity checking step. The protocol may be a connection oriented protocol such as, for example, TCP.

According to another embodiment, the present invention is a computer system configured to securely enable communication of data from a kernel of an operating system to a client. The computer system may include at least one processor; at least one data storage device coupled to the at least one processor; a plurality of processes spawned by the at least one processor, the processes including processing logic for: providing a context object that may include the data to be accessible to the client; providing the kernel with a secure object handle, the secure object handle including an address of the context object; sending the secure object handle from the kernel to the client over a bidirectional interface; receiving, from the client, the secure object handle from the client over the bidirectional interface, indicating that the client requires access to the data in the context object, and checking an integrity of the secure object handle in the kernel and allowing access to the data by the client if the integrity check is successful and disallowing access to the data by the client if the integrity check is unsuccessful.

The context object providing step may be carried out with the context object including a unique allocation stamp and the secure object handle may include a field configured to store a value of the allocation stamp. The secure object handle may include a signature and the secure handle integrity check may include a step of verifying the integrity of the signature. The context object providing step may be carried out with the context object including a unique allocation stamp. The secure object handle may include a field configured to store a value of the allocation stamp. The secure object handle may include a signature and the secure handle integrity check may include a step of verifying the integrity of the signature. The secure object handle providing step may include generating the signature as a predetermined function of a value of the unique allocation stamp and the address of the context object. When the integrity check is successful, the method further may include a step of the client accessing the data at the address of the context object in the received secure object handle. The signature integrity checking step may include a step of the kernel computing a temporary variable and comparing the computed temporary variable to the signature in the secure object handle received from the client and disallowing access to the data by the client if the computed temporary variable does not match the signature. The integrity checking step may include a step of disallowing access to the data by the client when the value of the allocation stamp in the secure object handle received from the client does not match the unique allocation stamp in the context object. The method may further include a step of making the data unavailable to the client by changing the unique allocation stamp. The secure object handle providing step may be carried out by incorporating at least the address of the context object and the signature in a header of a packet configured according to a predetermined communication protocol. The signature integrity checking step may include one or more Boolean Exclusive OR (XOR) operations. The signature integrity checking step may include a Cyclic Redundancy Check (CRC), for example. Only the kernel may carry out the signature integrity checking step. The protocol may be a connection oriented protocol, such as TCP, for example.

The foregoing embodiments are only representative and exemplary in nature. Other embodiments become apparent upon further study of the detailed description to follow.

BRIEF DESCRIPTION OF THE DRAWINGS

To facilitate a more full understanding of the present invention, reference is now made to the appended drawings. These drawings should not be construed as limiting the present invention, but are intended to be exemplary only.

FIGS. 9*a-f* show details of the formats of the LFP Packet 400 of FIG. 7 for different control messages in which:

FIG. 9*a* shows a control message prefix 500 common to all control messages;

FIG. 9*b* shows a Flow Context 508 common to all control messages;

FIG. 9*c* shows an "Open" Control Message format 520, the same format also being used in an "OpenAck" Control Message;

FIG. 9*d* shows a "Close" control message format 522, the same format also being used in a "CloseAck" Control Message;

FIG. 9*e* shows an "Update Tokens" control message format 524; and

FIG. 9*f* shows an "Update Map Byte" control message format 526, the same format also being used in an "Update Map Word" control.

FIGS. 11A-11D collectively show a pseudo code listing, illustrating a Selective Acknowledgement and Retransmission Method according to an embodiment of the invention;

DETAILED DESCRIPTION

The present description of the LTP/LFP protocols includes descriptions of embodiments that support multiple independent inventions, including (without limitation) methods and/or systems for secure object handle, selective retransmission (bitmap), flow control and/or stacking of two connection oriented protocols.

Figure 5:
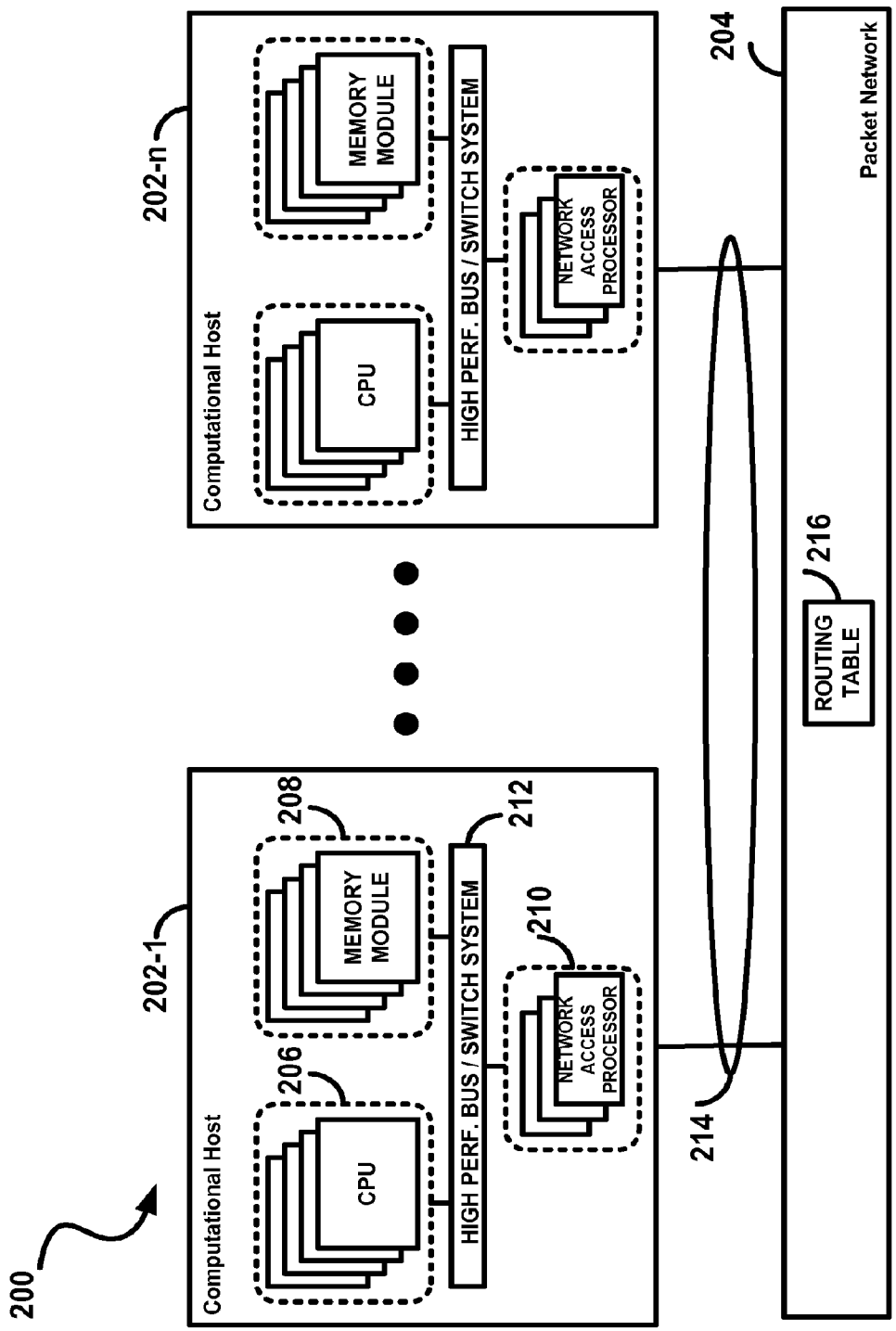
FIG. 5 shows a high performance computer system 200 according to an embodiment of the invention.

The overall architecture of a high performance computer system 200 according to an embodiment of the invention is shown in FIG. 5, including a number of Computational Hosts 202-$i$, where i ranges from 1 to n. The Computational Hosts 202 are fully interconnected by a packet network 204.

Each computational host may include a number of CPUs 206; memory modules 208; and network access processors 210; all interconnected by a high performance bus or switch system 212. Each computational host may be configured as a symmetric multi processor (SMP) system according to the state of the art, and is connected to the packet network 204 through one or more links 214. The high performance bus or switch system 212 is advantageously tightly connected to the CPUs 206 and the memory modules 208, and may be based on a bus protocol such as Hyper Transport [SPEC ref]. Although the memory modules are shown to be located symmetric for all CPUs of an SMP system, i.e. a UMA (Uniform Memory Access) architecture, this invention applies equally to NUMA (None Uniform Memory Access) architectures as well.

The packet network 204 may be a simple layer 2 network which routes packets received on any of its links 214 to predetermined computational hosts 202 according to a routing table 216 stored in the packet network 204. The packet network 204 may be implemented in any of a number of commercially available systems, or may be customized for optimal performance in the high performance computer system 200. The links 214, connecting the computational hosts 202 with the packet network 204 may be implemented as copper or fiber links to carry data packets according to a known protocol. A number of commercially available high speed link technologies are suitable here, such as Gigabit Ethernet, Infiniband, and others. As well, other suitable high speed link technologies may also be developed in the future. Although embodiments of the present invention are described hereunder with a specific technology (in this case, Infiniband) for the links 214 and the packet network 204, it is understood that other implementations may utilize other technologies.

Figure 6:
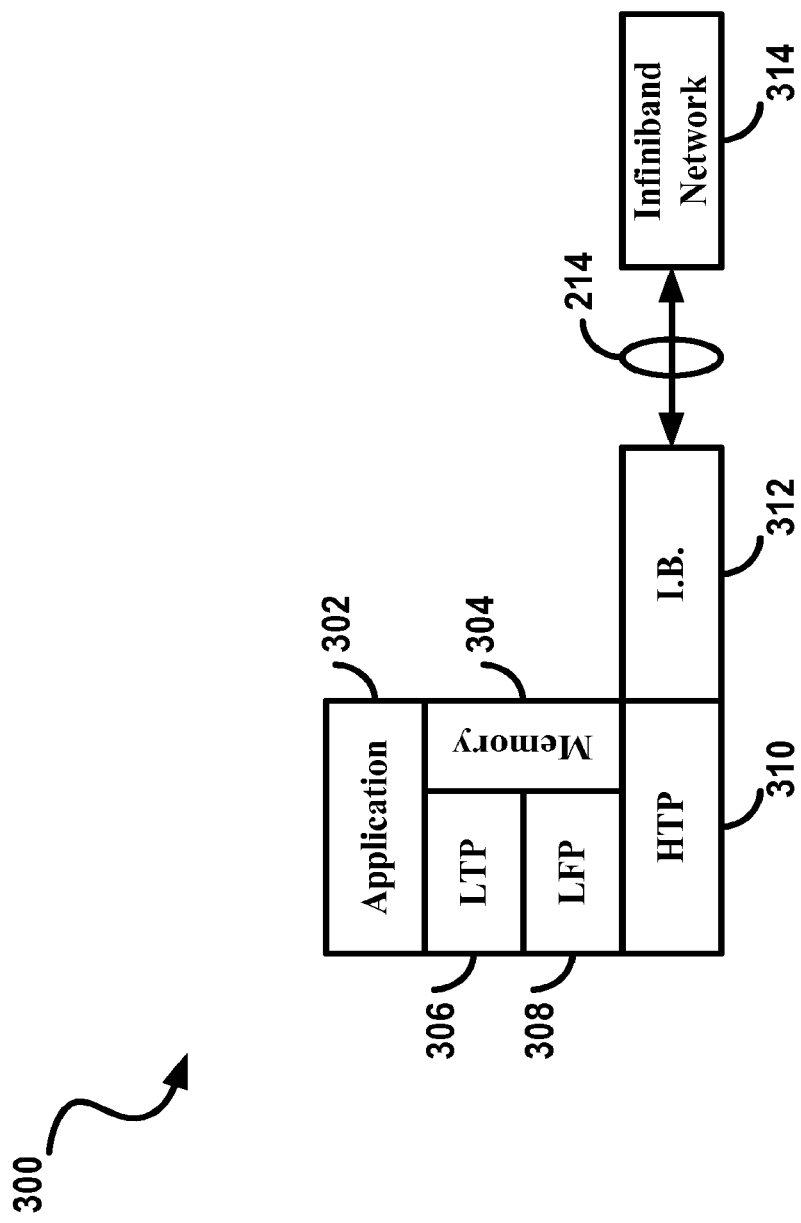
FIG. 6 shows an exemplary software architecture 300 for the high performance computer system 200 of FIG. 5, including an LTP (protocol) 306 and an LFP (protocol) 308.

FIG. 6 shows an exemplary software architecture 300 for the high performance computer system 200, according to an embodiment of the invention. To enable the high performance computer system 200 to execute a distributed application with distributed memory, a parallel programming model must be chosen and the application program written and compiled with the capabilities of the underlying computer system and software architecture in mind. The parallel programming model chosen for the purpose of this description is based on a global address space spanning all memory in all memory modules. The UPC programming language may be suited to program applications for this environment which is reflected in the software architecture 300. The software architecture 300 may include, according to embodiments of the present invention, an Application 302; a Memory 304; and a number of blocks representing the following packet protocols:

Liquid Transport Protocol (LTP) 306;
Liquid Flow Protocol (LFP) 308;
Hyper Transport Protocol (HTP) 310; and
Infiniband (I.B.) 312.

Also shown in FIG. 6 is an Infiniband Network 314. According to embodiments of the present invention, at least two of the computational hosts 202 of FIG. 5 may include the capabilities implied by the exemplary software architecture 300. The Application 302 may be a distributed application, i.e. a full or partial copy of the application resides in each computational host 202 that is participating in the application. For simplicity of the description, it is assumed that all computational host 202 are configured identically, but it is also within the present scope that some or each of the computational hosts 202 may be configured differently and include other programs as well.

Figure 1:
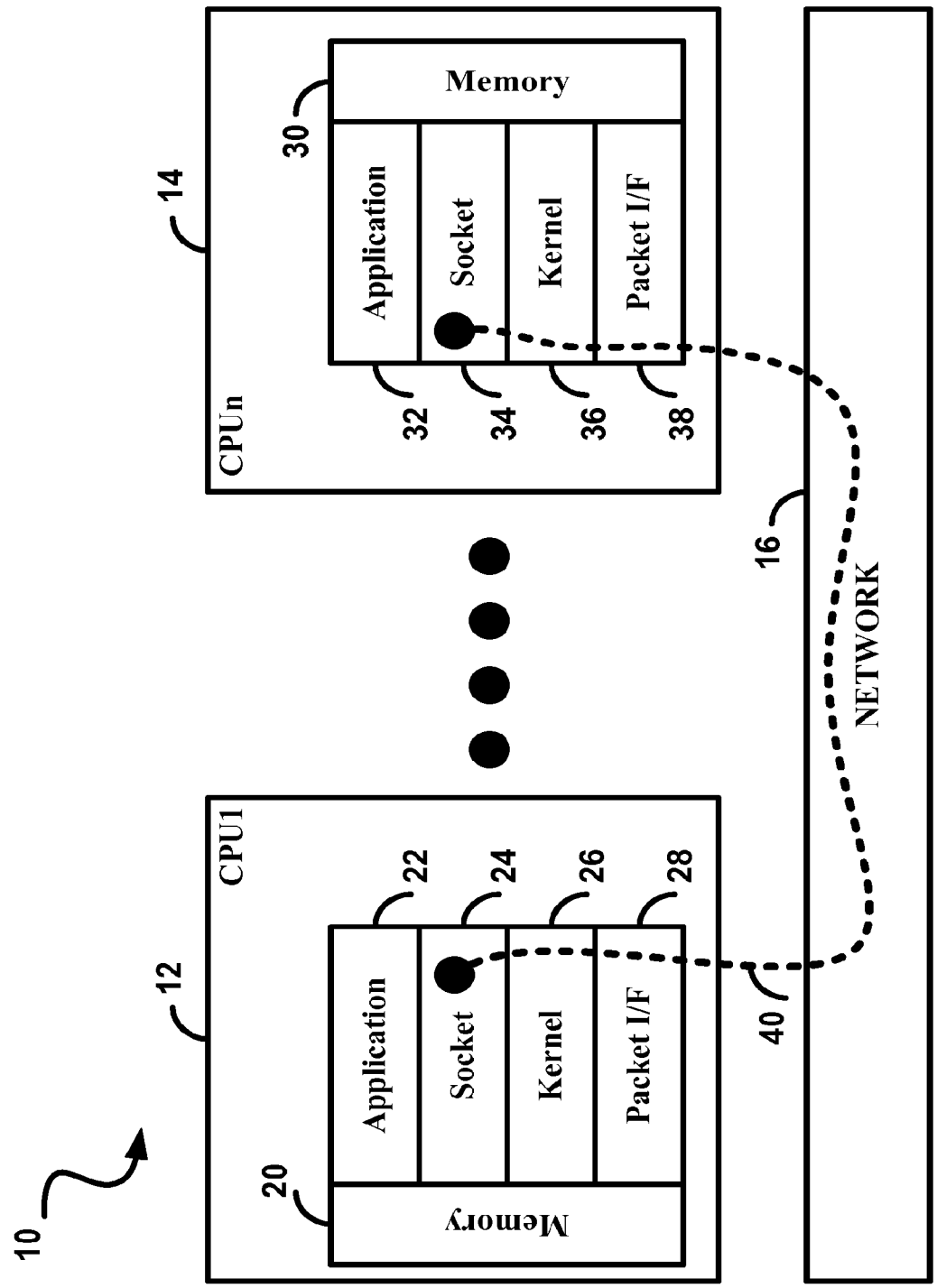
FIG. 1 illustrates an exemplary multi-processor system of the prior art.
Figure 2:
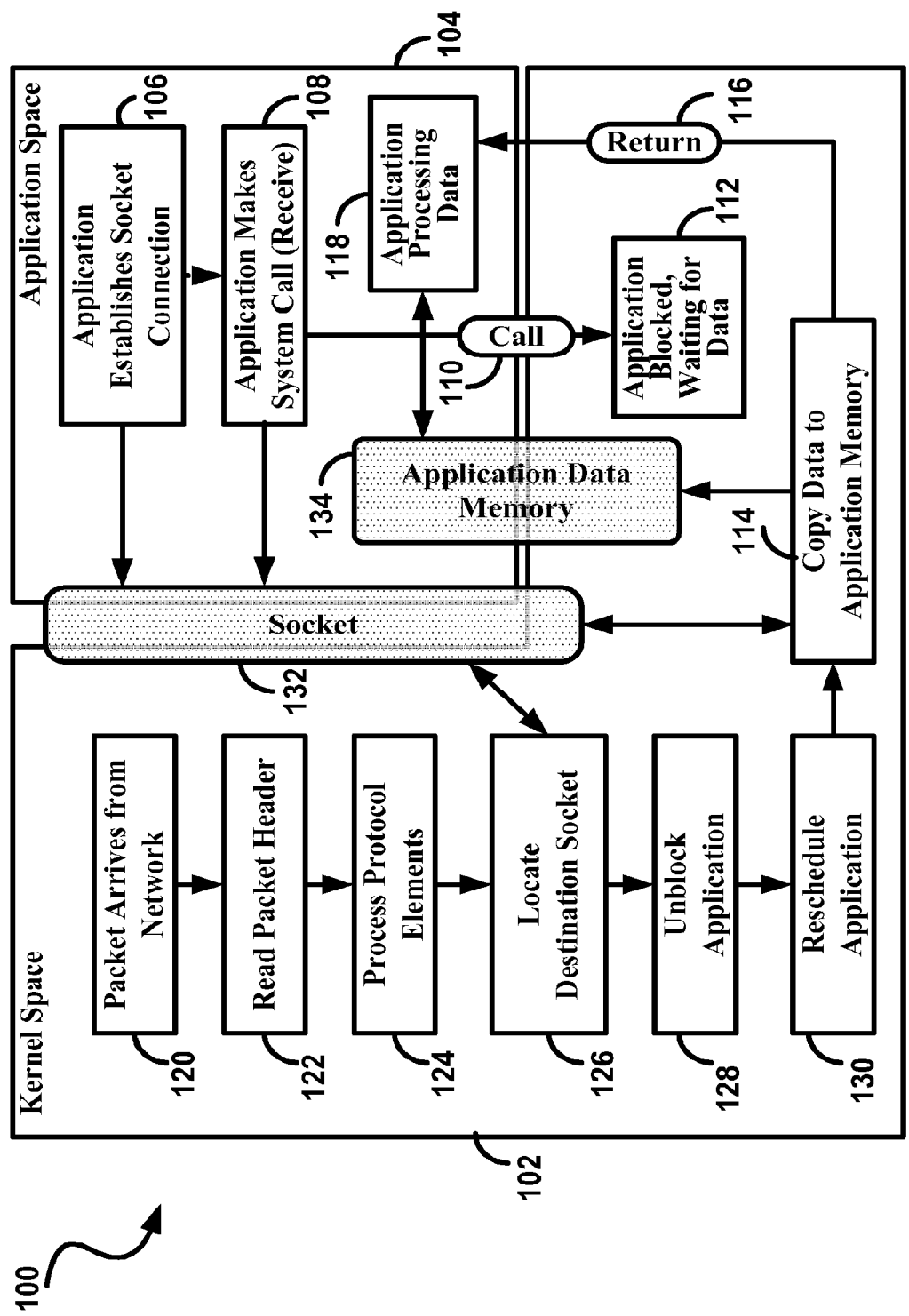
FIG. 2 is a simplified flow chart illustrating a conventional method by which an application in a multi-processor system of FIG. 1 receives data from a data link using a data transport protocol such as TCP/IP.
Figure 3:
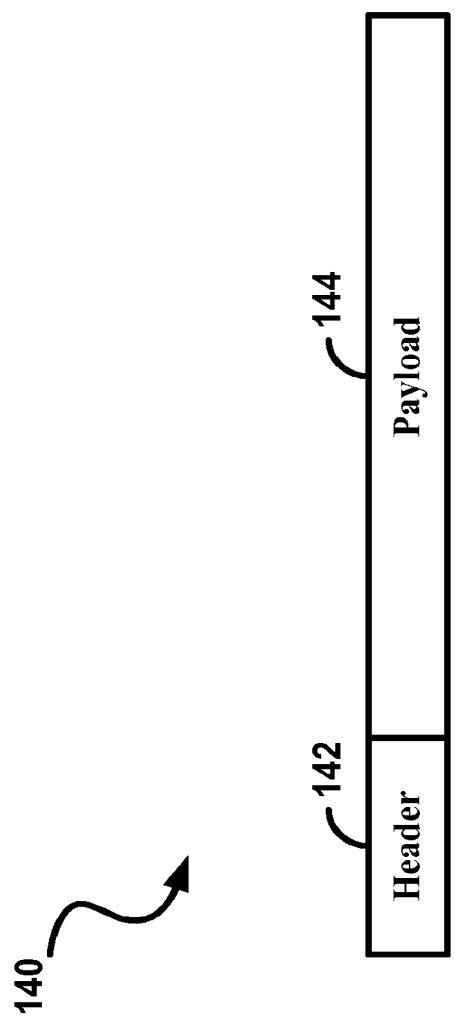
FIG. 3 illustrates the format of a conventional data packet of the prior art.
Figure 4:
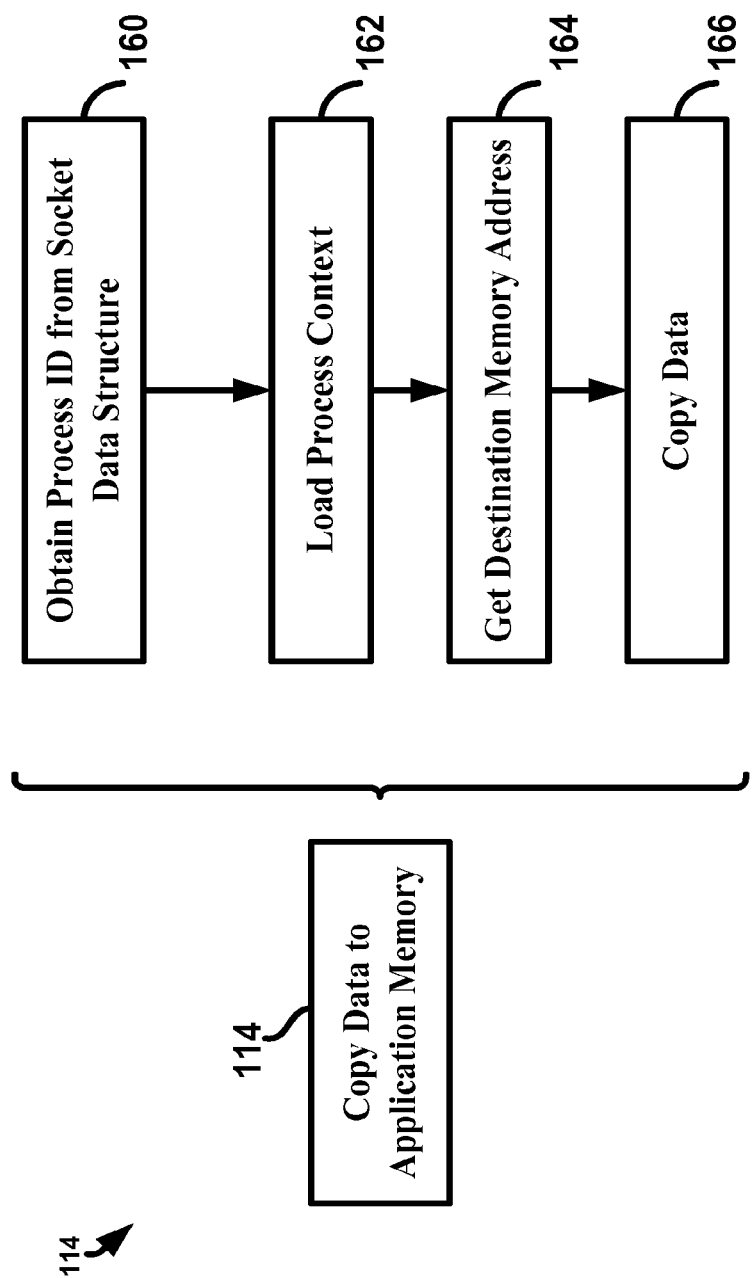
FIG. 4 is an expansion of the step 114 "Copy Data to Application Memory" from FIG. 2.

Adjacency of the blocks 302-312 in the diagram of FIG. 1 indicates the functional connectivity of the blocks. Therefore, as Application 302 is adjacent the Memory 304, the Application 302 is able to directly access the Memory 304, and the Liquid Transport Protocol (LTP) 306. The protocols LTP 306, LFP 308, and HTP 310, also have direct access to the Memory 304. The Packet Network 204 is connected via the links 214 to the Infiniband block I.B. 312. The sequence of the adjacent blocks Application 302, LTP 306, LFP 308, HTP 310, I.B. 312, illustrates a communications path for the Application 302 in one computational host 202 (e.g. 202-1 of FIG. 5) to reach the Application 302 or the Memory 304 of another computational host 202 (e.g. 202-$n$ of FIG. 5) via the Infiniband Network 314.

The protocols LTP 306 and LFP 308 are, according to embodiments of the present invention, implemented in the kernel of the operating system, running in supervisory mode, while the Application 302 is a program running in application mode. The protocols HTP 310 and I.B. 312 may be implemented in hardware. The blocks of the software architecture 300 may be mapped on the modules of the high performance computer system 200 of FIG. 5 as follows:

Application 302→CPUs 206;
LTP 306→CPUs 206;
LFP 308→CPUs 206;
Memory 304→Memory Modules 208;
HTP 310→bus or switch system 212;
I.B. 312→network access processors 210, and
Infiniband Network 314→Packet Network 204.

Other configurations are also possible. For example, the high performance bus or switch system 212 may be implemented with a different protocol, or the implementation of the Liquid Flow Protocol (LFP) 308 may be divided between the CPUs 206 and the network access processors 210, bypassing the HTP 310. Many other variations may occur to persons skilled in this art.

The roles of the different protocols, in broad terms, will be described next, to be followed by more detailed descriptions of the LFP 308 and LTP 306 protocols, according to embodiments of the present inventions. As described above, applications in one computer may communicate reliably with other computers using standard protocols such as TCP/IP, which protocols require substantial support from the kernel.

In a multiprocessing environment, such as the high performance computer system 200, it is desirable to provide a reliable but more efficient communications system that supports direct communications between the applications on the different computational hosts 202. The parallel programming paradigm of global address space for example requires reliable read and write operations from an application running on a CPU in one computational host 202 to a memory located in a different computational host.

The known protocols HTP 310 and I.B. 312, together with the Infiniband Network 314 provide the facilities for accessing multiple CPUs 206 and Memory Modules 208 within a computational host 202, and between different computational hosts 202 respectively. The present LFP 308 and LTP 306 protocols have been designed to provide an extremely efficient method for linking distributed applications to distributed memory.

Liquid Flow Protocol (LFP)

Figure 7:
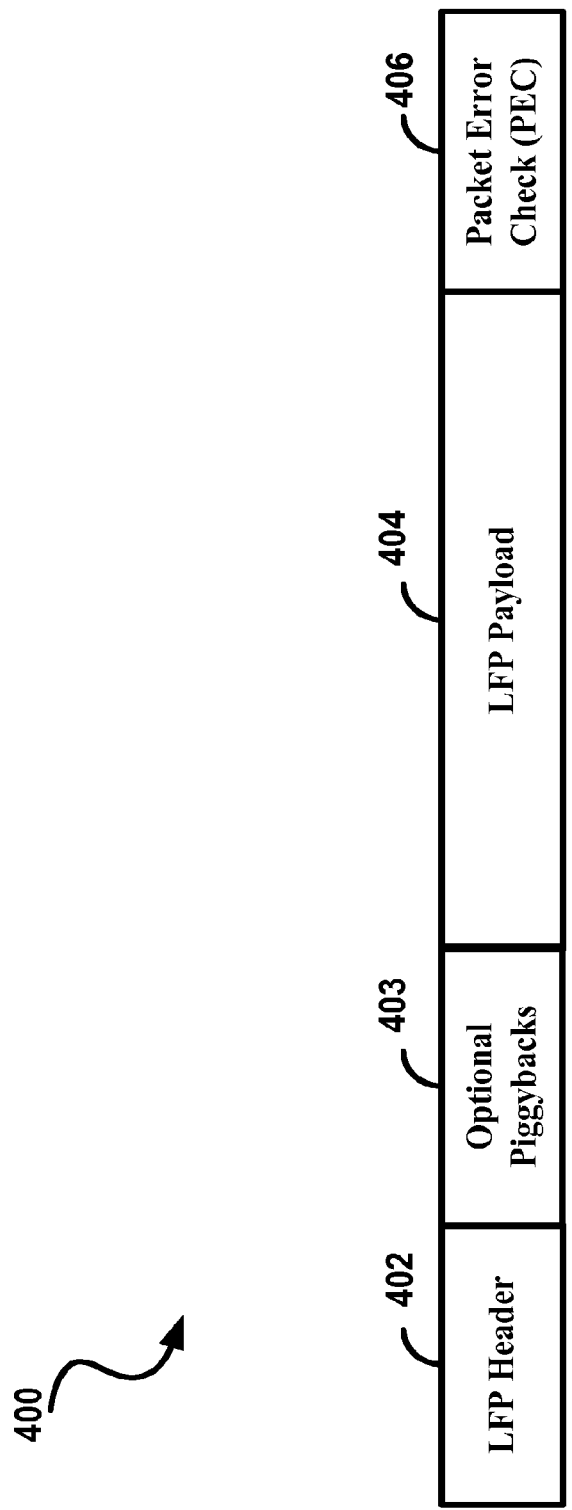
FIG. 7 illustrates the format of a LFP Packet 400 according to an embodiment of the invention.

An embodiment of the LFP 308 is a quasi layer 3 packet protocol and supports both point-to-point and point-to-multipoint (multicasting) communication. FIG. 7 illustrates a format of a LFP Packet 400, including a LFP Header 402, an optional Piggybacks Field 403, a LFP Payload 404, and a LFP Packet Error Check (PEC) 406, according to an embodiment of the present invention. The LFP 308 provides connections (LFP flows) between end points (Computational Hosts 202) of the high performance computer (HPC) system 200 (FIG. 5). Any type of data traffic, including IP packets and Ethernet frames, may be encapsulated as a LFP Payload 404. In particular, packets of the Liquid Transport Protocol (LTP) 306 described in more detail below, may advantageously be encapsulated as the LFP Payload 404.

Main characteristics of the LFP 308 may include flow control and selective retransmission. The LFP 308 throttles multi-flow traffic at the source and allows receiving buffer pools to be shared among different flows at the destination. Sharing of buffer pools at the destination has the advantages of reduced memory requirement and simplicity in buffer management. In the following, packet processing at both ends of the transmission is described as well as an exemplary scheme for buffer management. The implementation of the LFP 308 may reside entirely in the software of the CPUs 206 of the HPC 200 (FIG. 5), or it may be shared with the network access processors 210 which may also provide bidirectional Direct Memory Access (DMA) and thus very efficient transfer between the LFP Packets 400 and the Memory Modules 208. The PEC 406 may be entirely processed by the network access processors 210, thereby relieving the software of the CPUs 206 of this task.

According to embodiments of the present inventions, the LFP packet format 400 may have the following general characteristics:

The LFP Header 402 provides information guiding the processing and routing of an LFP packet 400.

The PEC field 406 provides error detection for the protection of the entire packet.

Similar to most protocols, the LFP Payload 404 is encapsulated in the packet and transmitted end to end unmodified.

The LFP Header 402 contains fields for the purpose of end-to-end flow control.

The LFP Header 402 contains fields for controlling selective retransmission. They help achieve much more efficient retransmissions than TCP.

Multiple types of packet streams in and out of a node are supported such that troubles with one stream will not interfere with the traffic in another stream. The types of stream differ in that they have different control and reliability characteristics.

A flow control category field in the LFP Header 402 partitions packet streams into two categories: strictly controlled flows and loosely controlled connectionless streams. Strictly controlled flows, or just "flows", apply to connection-oriented communication where tokens (credits) are assigned to remote sending nodes. Loosely controlled streams apply to connectionless communication where there is no persistent one-to-one association between the communicating nodes. As the name suggests, a loosely controlled stream has a lesser level of control on the packet stream and it is possible that the destination may be overrun by a burst of concurrent traffic from a large number of sources.

As a result of the characteristics of the flow control mechanism of the LFP 308, receiving buffers can be maintained with only two buffer pools, one for each category. This helps simplify receiving buffer management and hardware design as opposed to one pool per flow.

Traffic control information such as for flow control and retransmission can be piggybacked on other types of messages both for processing and transport efficiencies and for fast response.

A segmentation mechanism may be provided to allow a large packet to be segmented into smaller segments for transmission. As far as the LFP is concerned, a segment resembles a packet in all respects except for segment control fields in the header which may be used to reassemble the large packet at the receiving end. For simplicity, we will use the term "packet" for the protocol data unit (PDU) of LFP, whether it is a simple packet or a segment of a larger packet, unless the distinction must be made in descriptions that involve segmentation and/or reassembly (SAR).

Figure 8:
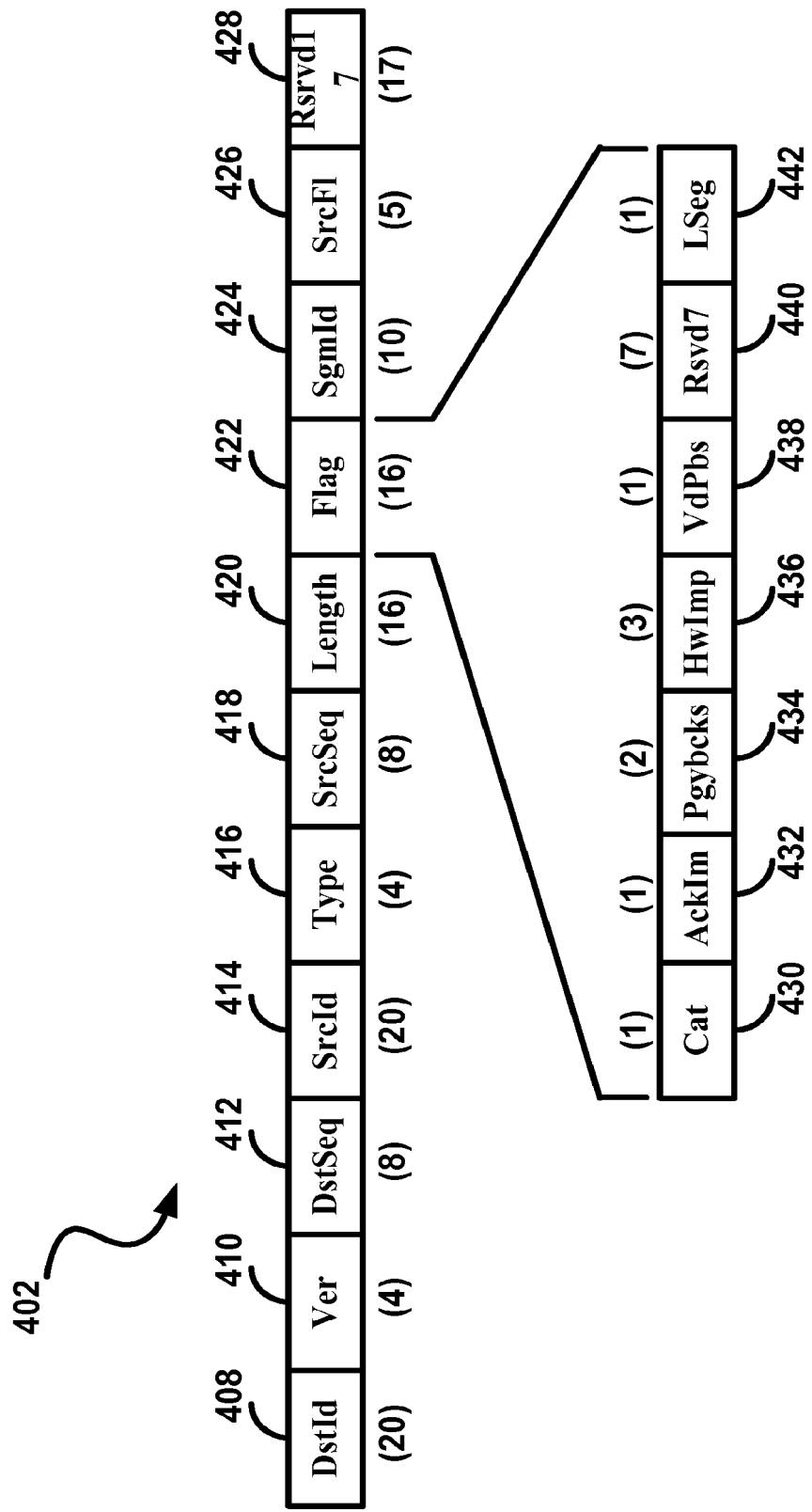
FIG. 8 illustrates the structure of the LFP Header 402 of the a LFP Packet 400 of FIG. 7.

FIG. 8 illustrates the structure of the LFP Header 402. The fields of the LFP Header 402 may include, for example:

408: Destination Identifier (DstId);
410: Version (Ver);
412: Destination Sequence Number (DstSeq);
414: Source Identifier (SrcId);
416: Payload Type (Type);
418: Source Sequence Number (SrcSeq);
420: Packet Length (Length);
422: Flags Field (Flag);
424: Segment Identifier (SgmId);
426: Source Flow Identifier (SrcFl), and
428: a 17-bit reserved (Rsrvd17) to pad the length of the LFP Header 402 to 128 bits.

The Flags Field (Flag 422) may be further divided, for example, into the following fields:

430: Flow Category (Cat);
432: Acknowledge Immediate (AckIm);
434: Piggybacks Count (PgyBks);
436: Hardware features bits (HwImp);
438: Void Piggybacks (VdPbs);
440: a 7-bit reserved field for future use (Rsvd7), and
442: Last Segment field (LSeg).

The size (in bits) of each field is indicated in brackets adjacent to each field. The significance and use of these packet header fields will become apparent from the following description of features of the LFP 308 in the context of the HPC 200.

Addressing (408, 414)

Each Computational Host 202 of the HPC system 200 may be assigned an LFP address. The LFP Header 402 of each LFP Packet 400 includes the source and destination identifiers (the 20-bit SrcId field 414 and the 20-bit DstId field 408, representing the addresses of the source and the destination of the packet respectively), thus allowing the transparent conveyance of LFP Payload 404 data from any Computational Host 202 to any other Computational Host 202. The Destination Identifier field 408 and the Source Identifier field 414 may each be, for example, 20 bits long. Such a bit length allows over one million entities to be addressed for both the source and destination of the packet. In the embodiment of the HPC system 200 using an Infiniband Network 314, only the lower 16 bits of the Destination Identifier and Source Identifier fields 408 and 414 are used in the assignment of LFP addresses. This allows direct use of an LFP address as an Infiniband LID (local ID) for traffic switching without an address lookup. Note that under the Infiniband specification Infiniband LID values of hexadecimal 0x0001 to 0xBFFF are used for point-to-point addressing while LID values of hexadecimal 0xC000 to 0xFFFE are used for multicasting.

Payload Types (416)

The Payload Type field (Type 416) of the LFP header 402 may be, for example, a 4-bit field, allowing the distinction of up to 16 types of payload. For example, the following well-known types of traffic may be encapsulated directly by the LFP 308, as indicated by the Payload Type 416:

Ethernet frame tunneling (type=1)
IP v4 packet transport (type=2)
IP v6 packet transport (type=3)
MPI packets (type=4)
GASnet packets (type=5)

The Payload Type 0 indicates a control message. Control messages are used to open and close connections (flows) and for flow control, as noted below. Ethernet (payload type 1) and IP traffic types (payload types 2 and 3) are industry standard. MPI (Message Passing Interface, payload type 4) is a loosely defined standard for multi-processor communication in an HPC system using the "message passing" programming model, while GASnet (Global Address Space networking, payload type 5) packets carry messages generated under another multi-processor programming model supported by the GASnet conventions, as detailed at, for example, http://gasnet.cs.berkeley.edu/. The Message Passing Interface (MPI) (as detailed at, for example, http://www.llnl.gov/computing/tutorials/mpi/) requires the transport service to provide reliable transmission. There is no reliable transport functionality built in MPI. A single message loss between a pair of nodes within an MPI program execution environment may result in the total failure of the execution of the whole MPI program which involves a large number of computing nodes. On the other hand, collective MPI operations, such as barrier and various reduction operations, require multicasting, even though they could be implemented entirely using point to point packet transport services.

The HPC system 200 using the LFP 308 according to embodiments of the present invention provides a number of advantages in supporting MPI implementations, compared to a standard implementation based on TCP/IP. Firstly, the LFP 308 supports selective retransmission (described below). TCP was designed to suit diverse, heterogeneous transmission environments: high or low error rate, vastly differing bandwidth segments on an end-to-end path, dynamically changing transport conditions (among others), which do not apply to homogeneous systems with low transport error rates, such as the HPC system 200. The LFP 308 provides a reliable transport service that is designed to avoid prohibitively high overhead for high performance computation. Secondly, the LFP 308 utilizes a token-based flow control strategy to simplify end-to-end flow control to avoid congestion as well as destination overruns. Thirdly, the LFP 308 provides native multicasting capabilities, which can help speed up collective MPI operations. An embodiment of the LFP 308, described in more detail below, is a protocol that is especially well suited to carry both MPI and GASnet packets.

Piggyback Messages (403, 434, and 438)

The format of the LFP packet 400 includes the optional Piggyback field 403 that may be inserted between the LFP Header 402 and the LFP Payload 404. The 2-bit Piggybacks Count field 434 (within the Flags Field 422 of the LFP Header 402) indicates the number of control messages piggybacked on an LFP packet 400. Any LFP packet 400 (of any Payload Type) may have from 0 to 3 control messages piggybacked (i.e. inserted between the LFP Header 402 and the LFP Payload 404). If the LFP Header 402 indicates a Payload Type of 0, the LFP Payload 404 contains a control message, and with up to 3 additional control messages piggybacked, a single LFP Packet 400 may thus contain up to 4 control messages. When multiple control messages are piggybacked, they are concatenated without any space in between. Control messages piggybacked on a single packet can be in relation to different flows associated with the same node. Piggybacked control messages, as well as the carrier control message (in the payload of a LFP Packet 400 of payload type 0), are acted upon at the destination in natural order.

The 1-bit Void Piggybacks flag 438 is normally set to 0. It may be set to 1 to indicate to the destination that the piggybacked control message(s) in the Piggybacks Field 403 are void. This feature may be used in the case where a packet containing piggybacked control messages must be retransmitted, but the retransmitted copy of the piggybacked control message(s) should be ignored.

Alignment of LFP Packet Fields

The LFP 308, according to one embodiment thereof, is optimized for 64-bit computers. To take advantage of the higher efficiency of 8-byte memory accesses, the start of the LFP Payload 404 is aligned on an 8-byte boundary. This is achieved by virtue of the LFP Header 402 being 16 bytes in length, and by the requirement that the combined length of piggybacked control messages must be padded out to a multiple of 8-bytes.

Segmentation (424 and 442)

The LFP 308 supports segmentation of a large user packet to fit into the LFP Payload 404 limit of the maximum transfer unit (longest LFP Packet 400) that may be imposed by the link layer. The link layer comprises the Infiniband links 214 and the network 204 of the HPC system 200. When a user packet is segmented, each segment will conform to the generic LFP packet format as defined above. From the link layer's perspective, there is no difference in between a segment of a packet or a non-segmented packet. They both take the same form and are the unit of transfer transaction between the LFP 308 and the link layer. LFP packet segmentation and reassembly are internal to LFP. The LFP header 402 carries information to help the receiving LFP protocol entity reassemble segments into the original user packet payload.

The 10-bit Segment Identifier field (SgmId 424) of the Packet Header 402 specifies the sequential segment number of the current segment within a packet. The Segment Identifier 424 is assigned starting at 0, indicating the first segment. Preferably the length is fixed for all segments of a segmented packet to simplify reassembly of the packet into a consecutive memory space at the receiver, even if the segments arrive out of order. The 1-bit Last Segment field 442 of the Packet Header 402 is set to 0 for all but the last segment of a segmented user packet. In non-segmented packets, the Last Segment field 442 is always set to 1.

Version (410)

The initial version of the LFP 308 has a value of 0 set in the Version Field 410 (a 4 bit field) of the LFP Header 402. Including a version field in each packet permits future versions of the LFP protocol to be automatically recognized by the software, and even allows different versions to run on the same HPC system.

Sequence Numbers (412 and 418)

The Destination Sequence number 412 and the Source Sequence number 418 in the LFP Header 402 help with the LFP flow control and packet retransmission for reliable data transport, to be described in more detail below. They are each 8-bit fields, allowing 256 packets to be outstanding. This field is used as a modulo-256 value and as such allows effectively up to 127 packets to be outstanding unacknowledged without confusion.

Length (420)

The 16-bit Length field 420 specifies the length of the LFP Packet 400 in bytes, including the LFP Header 402, piggybacked control messages in the Piggybacks field 403 if any, and the LFP Payload 404, but excluding the PEC field 406. This would allow a maximum packet size of 64K bytes without segmentation if the link layer supports such a Maximum Transfer Unit (MTU). When an LFP packet is segmented, preferably each segment except the last one will have the same length. Segmentation allows a large application payload to be transferred without the need for application level segmentation and reassembly. The maximum size of application payload will depend on the link layer MTU unit (up to 64K bytes). An embodiment of the HPC system 200 provides an MTU of 2K bytes considering memory utilization for buffers, and the ability to encapsulate regular maximum size Ethernet frames of 1.5K bytes. The 10-bit Segment Identifier 424 of the LFP Header 402 allows user payload to be segmented into as many as 1024 segments. As a result, a client of LFP (e.g. an Application 302 in a Computational Host 202 of the HPC System 200) can directly submit a payload of up to 2 Mbytes without having to do application level segmentation and reassembly itself. This can be very useful in transferring large files.

Hardware Implementation Features (436)

Three bits may be provided in the Hardware Implementation Features field 436 which may be used for signaling to hardware that is processing the LFP packets. Typical uses for these bits may include, for example, to turn hardware segmentation on or off, or select a hardware reliability feature such as write verification and send verification.

Flow Category (430)

The Flow category of each packet may be indicated by the 1-bit "Cat" bit (Flow Category field 430). When the "Cat" bit is set to (0), it indicates to the receiving node that the packet is in a loosely controlled traffic category and therefore a receiving buffer should be allocated from the corresponding pool. Otherwise, the packet is in a regular (strictly controlled) flow and the receiving buffer should be allocated from the strictly controlled pool.

Acknowledge Immediate (432)

When the AckIm bit (in the 1-bit Acknowledge Immediate field 432) in the LFP packet header 402 is set to (1), this instructs the receiving node to acknowledge the reception of the packet immediately; otherwise, it is up to the receiving node to decide when and how to acknowledge the reception, as described in the section entitled Acknowledgments below.

Flows (426)

The Liquid Flow Protocol (LFP) supports the concept of flows (LFP flows). A flow may be defined as a predefined bidirectional stream of traffic between a pair of end nodes identified by the Destination Identifier 408 and the Source Identifier 414. A LFP flow is thus akin to a connection over which LFP packets are exchanged between a pair of end nodes (a packet channel). There can be multiple independent flows between a pair of end nodes. According to embodiments of the present inventions, a flow must be explicitly established between the pair of nodes (using the Open/OpenAck control messages, see below) before they can use it. Such a flow should also be terminated using the Close/CloseAck messages if it is no longer in use. Packets belonging to a unique flow are characterized through their LFP Header 402 by:

Destination Identifier 408;
Source Identifier 414;
Payload Type 416;
Source Flow Identifier 426 (a 5 bit field); and
Flow Category 430 (set to 1).

LFP Packets carrying control messages in their LFP Payload 404 do not belong to a flow, i.e. their Flow Category 430 is set to 0 and their Source Flow Identifier 426 is irrelevant (may also set to 0).

Similarly, Ethernet frames and IP packets (Payload Type 416 set to 1, 2, or 3) may be transported in LFP packets in connectionless mode. In the HPC context, LFP flows are valuable in providing reliable permanent connections between multiprocessor applications that follow any of the multi processor programming models, especially Message Passing Interface (MPI) and Global Address Space (GASnet) models (Payload Type 416 set to 4 or 5 respectively) in which efficient and reliable inter-processor packet channels are essential.

Control Packets

Control packets are of the form of LFP packets 400 with payload type=0, and an LFP Payload 404 containing a control message. Up to 3 Control messages may also be carried in the optional piggyback field 403. The format of control messages are shown in FIGS. 9a-f. All control messages may include a control message prefix 500, shown in FIG. 9a. The control message prefix 500 may include the following fields:

502: Control Message Type (msgType);
504: State (St); and
506: a reserved 2 bit field (Rsrv2).

Figure 9A:
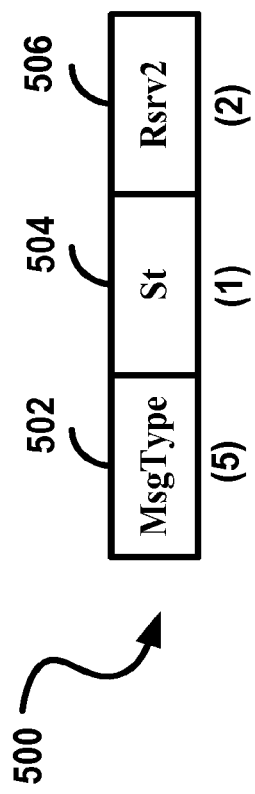
Figure 9B:
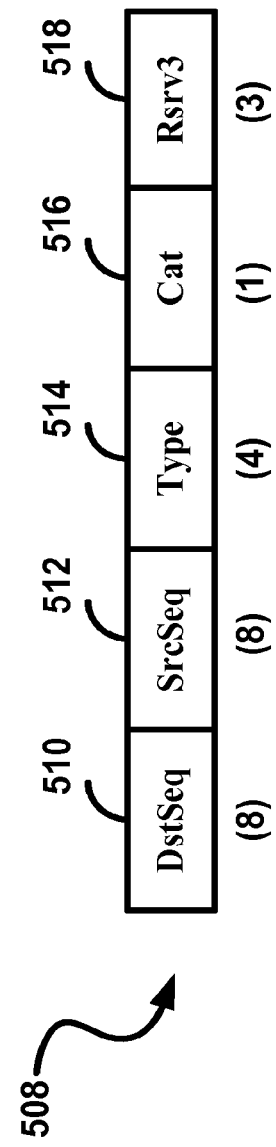

All control messages may also include a Flow Context 508, shown in FIG. 9b. The Flow Context 508 may include the following fields, with the size (in bits) of each field being indicated in brackets adjacent to each field:

510: Destination Sequence Number (DstSeq);
512: Source Sequence Number (SrcSeq);
514: Payload Type (Type);
516: Flow Category (Cat); and
518: a reserved 3 bit field (Rsrv3);

The function of the reserved fields 506 and 518 is not defined, but the initial purpose of these fields is to pad the length of the control message prefix 500 and the Flow Context 508 to 8 and 24 bits respectively. The Control Message Type 502 field (a 5 bit field) allows up to 32 types of control messages. The following control message types have been defined:

"Open" Control Message (format 520, FIG. 9c): An Open control message is sent by a source node to a destination node to request to open a new strictly controlled flow.

"OpenAck" control message (format 520, FIG. 9c): An OpenAck control message is sent by a destination node in response to an Open control message. The destination node may either accept or reject the request to open a new flow.

"Close" control message (format 522, FIG. 9d): Either end of an existing flow send a Close control message to initiate the closure of the flow.

"CloseAck" control message (format 522, FIG. 9d): The responder to a Close control message must terminate the flow if it is existing, and send a CloseAck control message with the state field "St" 504 (a 1 bit field) in the Control Message Prefix 500 set to "1." The only case for a negative acknowledgement (state field "St" 504 set to "0") is if the flow does not exist.

"Update Tokens" control message (format 524, FIG. 9e): The Update Tokens control message allows the message sender to throttle the packet traffic transmitted towards it by the receiver of the message. The receiver of an "Update Tokens" message may send its own "Update Tokens" message to acknowledge the reception and/or to grant the other end additional tokens.

"Update Map Byte" control message (format 526, FIG. 9f): The "Update Map Byte" control message provides the other end a picture of the packet receiving status using a bit map of 8 bits length, to acknowledge received packets.

"Update Map Word" control message (format 526, FIG. 9f): The "Update Map Word" message is similar to the Update Map Byte control message, except that the bit map length is 16 bits.

The formats of each of the control message types is described below, after first describing the remaining fields of the control message prefix 500 and the Flow Context 508. The State field (St) 504, a 1 bit field, of the control message prefix 500 is interpreted depending on the control message type. The Flow Context 508 (FIG. 9b) provides the context of the target flow that the control message is about. The Destination Sequence Number (DstSeq) 510 and the Source Sequence Number (SrcSeq) 512 fields of the Flow Context 508 are 8 bit fields each, and give the destination and source sequence numbers respectively of the flow at the packet source. The Payload Type 514 field (a 4 bit field) and the Flow Category 516 field (a 4 bit field) specify the Payload Type and the category of the target flow respectively. The Payload Type 514 and the Flow Category 516 of a control message have the same value sets as the Payload Type 416 and Flow Category 430 of the LFP Header 402 (FIG. 8).

The formats 520, 522, 524, and 526 are illustrated in the FIGS. 9c, 9d, 9e, and 9f respectively. As shown, the fields for the control message prefix 500 and the Flow Context 580 (FIGS. 9a and 9b, respectively) may be common to each of the formats 520-526. Each of the formats 520-526 may also include an 8-bit Source Flow Identifier field (SrcFlowId) 528. The SrcFlowId parameter has a one-byte representation and utilizes only the 5 least significant bits, allowing for up to 32 concurrent flows per payload type end to end. The Source Flow Identifier 528 of a control message, together with its Payload Type 514 and Flow Category 516, specify the target flow as a whole whereas the corresponding fields 426, 416, and 430 in the headers 402 of individual LFP packets simply identify each such packet as being part of the indicated flow.

The format 520 is used in the "Open" Control Message as well as the "OpenAck" control message. The format 520 may include additional fields:

530: Destination Flow Identifier (DstFlowId);
532: Source Tokens (STkns); and
534: Destination Tokens (DTkns);

The Destination Flow Identifier 530 (an 8 bit field) is an alternate identifier that may be assigned to the same flow that is already uniquely identified by the Source Flow Identifier 528, as detailed below. The 4-bit Source Tokens field 532 and the 4-bit Destination Tokens field 534 are designed to carry numeric values that relate to available buffer space, and are used in flow control, as discussed below. The format 522 is used in the "Close" Control Message as well as the "CloseAck" control message. In addition to the common fields (control message prefix 500, the Flow Context 508, and Source Flow Identifier 528), the format 522 also includes the 8-bit Destination Flow Identifier field 530.

The format 524 is used in the "Update Tokens" control message that may be used in flow control to throttle traffic, see explanation below. In addition to the common fields (control message prefix 500, the Flow Context 508, and Source Flow Identifier 528), the format 524 also includes the Source and Destination Tokens fields 532 and 534 (a 4 bit field each) respectively.

The format 526 is used in the "Update Map Byte" control message that provides a selective acknowledgement method using an 8- or 16-bit RxMap field 536, as described in the section Packet Acknowledgement below.

Opening and Closing of Flows

Figure 10:
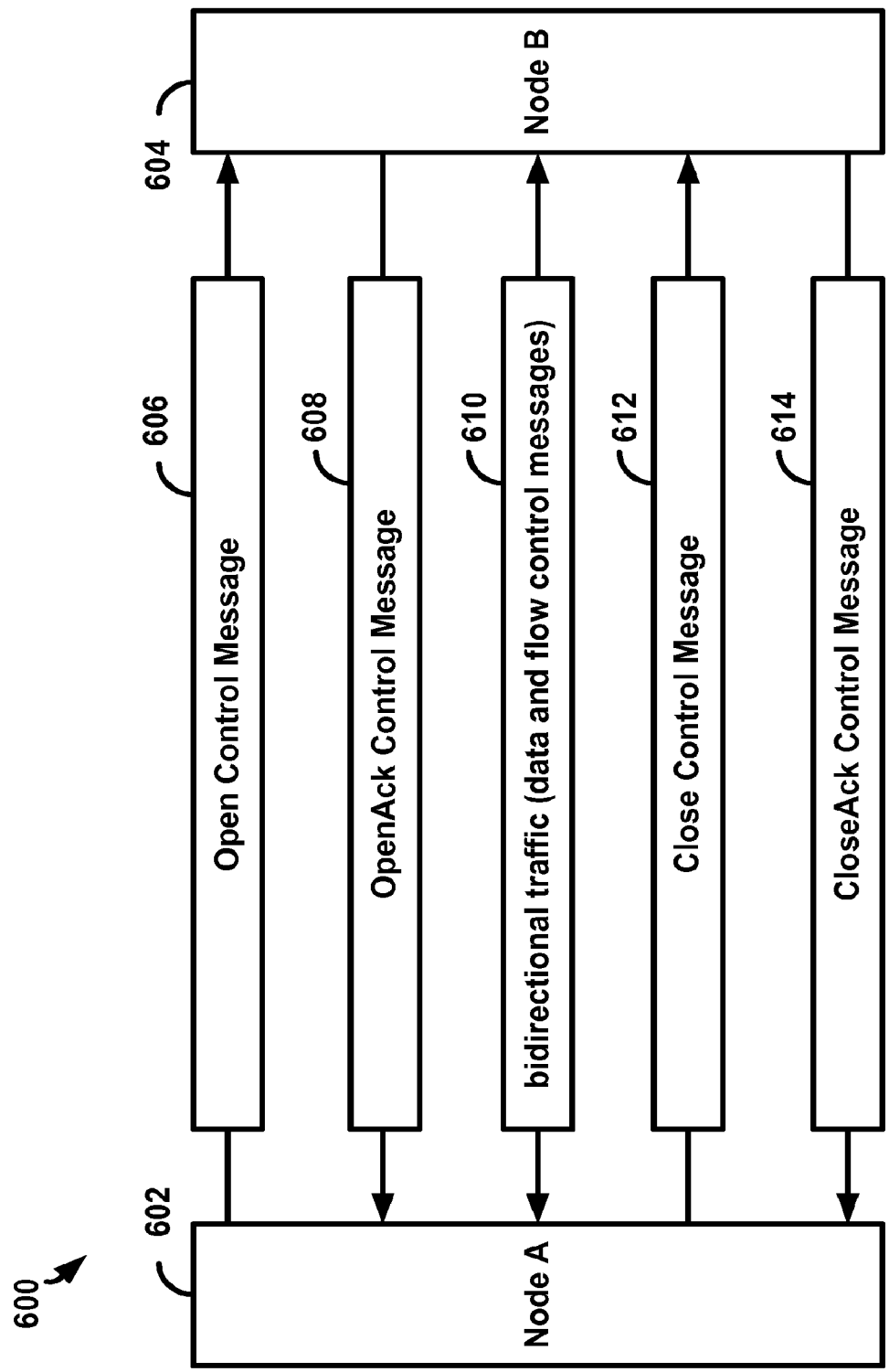
FIG. 10 is a sequence chart 600 illustrating a flow of the LFP 308 of FIG. 6.

An LFP flow is explicitly established before it can be used to transfer data, and may be explicitly closed. This is illustrated in FIG. 10 in the form of a sequence chart 600. The sequence chart 600 shows two nodes, Node A (602) and Node B (604), linked through the exchange of messages, in order from the top (earliest in time) to the bottom:

606: "Open" control message, sent from the Node A to the Node B;
608: "OpenAck" control message, sent from the Node B to the Node A;
610: "bidirectional Traffic", i.e. LFP Packets exchanged between the Nodes A and B;
612: "Close" control message, sent from the Node A to the Node B; and
614: "CloseAck" control message, sent from the Node B to the Node A;

The message "Open" 606 is an "Open" control message (format 520, FIG. 9c) sent from the Node A to the Node B. The "Open" message 606 includes the parameters in the Source Flow Identifier field 528 to allow the initiator (Node A) to select a source Flow ID (srcFlowId) for the flow to be opened, and in the Destination Flow Identifier field 530 a destination Flow ID (dstFlowId). The destination Flow ID is merely proposed by the Node A to the other end (i.e. the Node B). The Node B may accept the proposed destination Flow ID on accepting the request to open a flow, or change it. Having a pair of flow IDs to identify a flow at establishment time helps improve the success rate of flow establishment in the case where both ends attempt to initiate a flow at the same time.

The DstSeq and SrcSeq fields of Flow Context (Destination and Source Sequence Number fields 510 and 512 of the Flow Context field 508, FIG. 9b) specify the initial destination and source sequence numbers for the flow. The "Open" message 606 may further include a source token value (STkns) in the Source Tokens field 532 to indicate to the Node B the amount of traffic the Node B is allowed to send to the Node A within the flow before more tokens are granted using the "Update Tokens" message (see the description of flow control below). The "Open" message 606 may further include a proposed destination token value (DTkns, Destination Tokens field 534) to the destination (i.e. Node B). It is up to the destination to select and grant the number of destination token value deemed appropriate by the destination based on the available resource at the destination. Flow control is described below in the section entitled "Flow Control."

The message 608 "OpenAck" is an "OpenAck" control message (format 520, FIG. 9c), by which the Node B notifies the initiator Node A that it accepts the flow. The 608 "OpenAck" message uses the same format (520) as the "Open" message 606 and includes the same parameters (dstFlowId and DTkns) which may simply be the same values proposed by the Node A in the "Open" message. The values of dstFlow and dstTokens may alternatively be chosen differently by the Node B. The Status field 504 of the Message Prefix 500 in an "Open" message indicates if the acknowledgement is positive (1) or negative (0). After the "Open" and "OpenAck" messages (606 and 608) have been exchanged by the Nodes A and B (602 and 604), and the acknowledgement is positive, a "flow" is established between the two nodes. The flow is identified by the pair of flow identifiers (srcFlowId and dstFlowId) in the Source and Destination Flow Identifier fields 530 and 532 respectively, the payload Type (Payload Type field 514), and the flow category (Flow Category field 516), of the "OpenAck" message 608.

Figure 12:
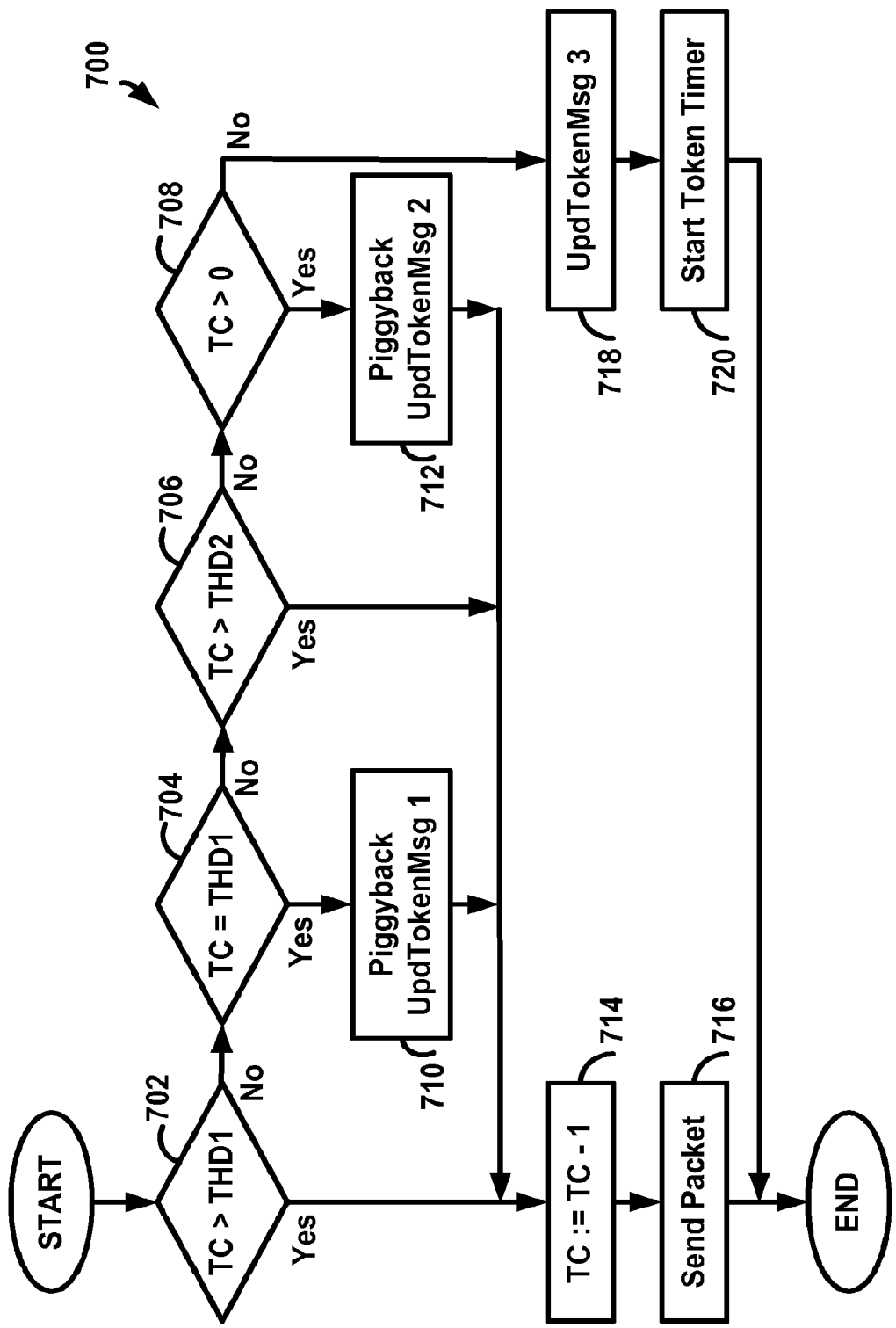
FIG. 12 is a flow chart of an exemplary "Tokenized Transmit Packet" method 700, according to an embodiment of the invention.

During the life of the flow, the "bidirectional traffic" 610 comprises data messages and control messages that are exchanged between the Nodes A and B (602 and 604). All such data messages and control messages are identified through the corresponding header and control message prefix fields as belonging to the indicated flow. Details of the "bidirectional traffic" 610 will be described below, including the aspects of Selective Acknowledgement and Retransmission Method (FIG. 11) and of token-based Flow Control (FIG. 12).

To begin the process of ending the connection, the Node A sends a "Close" message 612 to the Node B. The "Close" message 612 is a "Close" control message (Format 522, FIG. 9d) with the parameters that identify the flow (srcFlowId and dstFlowId in the Source and Destination Flow Identifier fields 528 and 530 respectively). The reply from the Node B 604 to the Node A 602, in the form of the "CloseAck" message 614, confirms the closure of the connection. The "CloseAck" message 614 is a "CloseAck" control message (format 522, FIG. 9d). Because more than one flow may be established using different Flow Identifiers between the same two nodes, the "CloseAck" message 614 also carries the parameters that identify the flow (srcFlowId and dstFlowId in the Source and Destination Flow Identifier fields 528 and 530 respectively). The Status field 504 of the Message Prefix 500 in a "Close" message indicates if the acknowledgement is positive (1) or negative (0). The responder of Close message (the sender of the "CloseAck" message) can set the Status field 504 (St) of the "CloseAck" message to 0 only if the flow does not exist. In either case of the flow as specified by the parameters of the "CloseAck" message ceases to exist if it existed at the sender of the "CloseAck" message right after the "CloseAck" message is sent. The "Close" control message may be sent from either end of a previously opened flow to initiate the shutdown of the flow. Accordingly, although the Node A had initiated the flow, the Node B could send the "Close" message and the Node A would respond with the "CloseAck" message.

The bidirectional traffic 610 (FIG. 10) in a flow includes any number of LFP packets 400 which may encapsulate in their payloads (LFP Payload field 404) data under a number of protocols as described earlier. The LFP packets may also carry control messages in their payload or as piggyback control messages (optional piggybacks field 403).

During the course of the flow, "Update Tokens" and "Update Map Byte" control messages (formats 524 and 526 respectively) may be used to regulate the traffic. In general terms, the "Update Tokens" control messages are used to indicate buffer availability at the opposite end of a connection: a sender may not send data packets when the number of buffers indicated by the receiver is insufficient. Again in general terms, the "Update Map Byte" control messages together with the Source and Destination sequence numbers (Source and Destination sequence number fields 418 and 412 of all messages) are used to acknowledge the receipt of data packets, or conversely, may indicate the loss of a packet. An embodiment of a token based flow control method according to the present inventions is described in detail in the section entitled Flow Control below. An embodiment of a method of selective acknowledgement and retransmission of packets according to the present inventions is described in detail in the next section.

Selective Acknowledgement and Retransmission Method

Persons skilled in the art will be familiar with other protocols and methods providing acknowledgements and retransmission of lost or error packets. TCP is an example of a general purpose protocol providing a packet retransmission method within a connection or flow. In the context of a high performance computer system, however, such as the closed HPC system 200 (FIG. 5), a very low error/loss rate across the packet network 204 and the links 214 is expected, while very high data rates, and very low latency of packet transmission between nodes (CPUs 206) are required. The selective retransmission method described below is designed to provide LFP packet transport reliability in this environment more efficiently than older protocols. Such improvements in reliability and efficiency may be realized by using a method of packet reception acknowledgement by the receiver and selective retransmission by the sender, also referred to as a "selective retransmission method", according to embodiments of the present invention. The LFP packet header format (402) includes fields that are defined for use with this method, and the LFP protocol includes control messages for this purpose. The selective retransmission method involves two nodes, for example Nodes A and B (FIG. 10), and comprises two interacting components, a "packet acknowledgement" that is performed at one node (for example Node B), and a "packet retransmission" that is performed at the other node (Node A).

A selective retransmission method may be described with the example of a "source node", and a "destination node." It will be understood that the method applies to all pairs of nodes (CPUs 206) in the HPC 200 of FIG. 5, such that any node may assume the role of the source node, and any other node may assume the role of the destination node. And, because the connections (flows) are bidirectional and data packets may be sent in either direction over the connection, the selective retransmission method may be applied symmetrically, such that every node may assume both the roles of source and destination nodes (in the sense of the flow of data) simultaneously. To simplify the description of the Packet Acknowledgement and the Packet retransmission component methods, especially with considering the names of the packet header fields, we will refer to the node that performs each component method as the source node, and to the distant node as the destination node, regardless of the logical flow of data packets and acknowledgements.

Packet Acknowledgement

The basis for selective retransmission is the knowledge of which packets the other end has received. This allows only those packets that are suspected of being lost to be retransmitted. The Packet Acknowledgement method comprises steps that the recipient of data packets (the source node) performs, including the type of information transmitted back to the sender of the data packets (the destination node). According to embodiments of the present invention, each LFP packet header 402 carries two sequence numbers: the source sequence number (SrcSeq 418) and the destination sequence number (DstSeq412). The source sequence number is maintained by a source node in its memory as a local source sequence number. The local source sequence number is incremented for each data packet sent, and is copied from the memory into the source sequence number field (SrcSeq 418) of the packet header 402. The source node also maintains a local destination sequence number in its memory. The local destination sequence number is a copy of the source sequence number (SrcSeq 418) of the packet header 402 of the last consecutively numbered packet that was received from a destination node.

The local destination sequence number thus constitutes a record indicating that all packets sent by the destination node with lower source sequence numbers have been received, while the local source sequence number records the (sequence number of the) last packet sent by the source node. If the packet received from the destination node contains the next higher source sequence number, the local destination sequence number is incremented. However, if the packet with the next higher source sequence number is not received, the destination sequence number will not be updated even if packets with higher source sequence numbers are received from the destination. When this happens, there is out of order transmission due to various conditions, or loss of packets.

Overall then, considering the bidirectional flow of packets between the Nodes A and B, the local destination sequence number allows the receiver (the Node A or the Node B) to acknowledge to the other end (the Node B or the Node A respectively) the packets received, though not necessarily all received packets. The traffic in one direction thus helps acknowledge traffic received in the opposite direction without the use of any control messages.

However, using normal traffic to acknowledge message reception is not sufficient in all conditions. It is not deterministic when the next packet is sent or if there is going to be another one, and as a result an additional mechanism is needed to guarantee the timely acknowledgement of received packets. To accomplish this, the LFP provides the Update Map control messages (format 526, FIG. 9*f*). The Update Map control message updates the destination node (Node B) about the local destination sequence number (recorded at the source node, Node A) in the normal way with the packet header. The source sequence number is also included in the packet header but it is not incremented when a control message packet is sent.

The Update Map control message (format 526, FIG. 9*f*) further provides a packet reception bit map (RxMap field 536) to allow for selective acknowledgment of packet reception. This feature provides a mechanism to inform the destination node, where packets appear to have been lost or have been received out of order. With the combination of the destination sequence number and the packet reception bit map, the remote node can selectively choose to retransmit only those packets which are believed to have been lost.

The issuing of an Update Map control message may be based on two factors: the max loss distance and max loss time. The max loss distance is defined as the number of packets between the earliest packet not yet received and the latest received packet inclusive, that is lowest and the highest destination sequence numbers of the received packets respectively. The max loss time is the time between the time the destination sequence number was last updated and the time the latest packet is received.

The selective LFP packet acknowledgement strategy can be summarized as follows:

Whenever a regular packet is sent to the other side, the Destination Sequence number is carried.

If the flow max loss time has elapsed, an Update Map message is issued.

When a packet is received such that the source sequence number in the packet exceeds the destination sequence number maintained locally by the flow max loss distance, the flow max loss distance is considered to have been reached. If the flow max loss distance has been reached, an Update Map message is issued.

If a packet is received in duplication, an Update Map message is issued to update the remote side about the current reception status.

If a packet is received with the AckIm (Acknowledge immediate) bit set to 1, the reception of this packet is acknowledged immediately either by a normal packet flying in the opposite direction or by an explicit Update Map control message. Pseudo code to illustrate an embodiment of the selective acknowledgement method for a single flow is shown FIGS. 11A-11D.

Packet Retransmission

As detailed above, the basis for selective retransmission is the knowledge of which packets the other end has received. The Packet Retransmission method comprises steps that the sender of data packets (the source node) performs, including receiving acknowledgements from the recipient of the data packets (the destination node). This alone, however, is not enough. Assume that the destination node has acknowledged implicitly (destination sequence numbers in the packet headers) or explicitly (through update map control messages) all packets that it has received from the source node. If no more packets arrive at the destination node, no more update map control messages will be sent by the destination node. And if there is also no further normal (data packet) traffic in the direction from the destination node to the source node, there will be no implicit acknowledgements of any packets. But if the source node had sent one or more further packets that were lost, for whatever reason, the source node of those additional packets will never know if the destination node has received any of those packets. This problem may be solved with a "send timer" at the sending end (the source node). When the source node sends a packet, the send timer is started. The send timer duration is set such that when it times out, the packet can be reasonably deemed to have been lost considering not only the roundtrip latency but also the acknowledgment strategy at the remote end (the destination node) which may postpone the acknowledgement of reception considerably (based on the Packet Acknowledgement method described earlier). A LFP packet retransmission strategy according to an embodiment of the present invention may be summarized as follows:

When a packet is transmitted for the first time, it is queued to the end of a Retransmission Job Queue, and the packet itself is retained in a buffer.

When an acknowledgment is received for a packet, its corresponding retransmission job is removed from the Retransmission Job Queue and the buffer is freed.

Timer trigger: There is a periodic timer ("send timer") associated with the Retransmission Job Queue. When the send timer fires it is immediately restarted and the first packet in the Retransmission Job Queue is transmitted again, with the Acknowledge Immediate bit (AckIm 432, see FIG. 8) in the Packet Header 402 set to 1. The job is not removed from the queue until it is acknowledged (see above).

On receiving an Update Map message, all packets identified as missing (all those bit positions with the value of 0 where there exists a higher bit position with the value of 1) are retransmitted. Note that there is only a single timer (per flow). When the timer times out, only one packet may be retransmitted even though more retransmission jobs may be in the queue.

Pseudo code illustrating the Selective Acknowledgement and Retransmission Method is presented as a listing in FIGS. 11A-11D. The pseudo code shows an exemplary implementation of the combined strategies for Packet Acknowledgement and Packet Retransmission (the incremental code for retransmission is shown in a bold type face). Only code relevant to the present topic is shown.

In the interest of greater clarity, it is assumed in the pseudo code that sequence numbers increment indefinitely and the bitmap that records the reception of packets by their sequence numbers has infinite capacity. In reality, sequence number fields in the current embodiment are limited to 8 bits, sequence numbers thus ranging from 0 to 255, wrapping around to 0 upon reaching 255. Additional logic is required to correctly work with numbers in a non-ambiguous window which may wrap around through 0. The maximum distance between sequence numbers of interest is a function of system delay and speed, and is not expected to exceed the non-ambiguous window (range up to 127) in the initial implementation. A larger range could be accommodated in a number of ways, for example simply by using larger sequence number fields.

Flow Control

While the tokens may be used in many different ways, the initial implementation will tie a token to a packet when not segmented or a packet segment when a packet is segmented. In other words, unsegmented packets and segments are treated alike, as far as flow control is concerned, and we will use the term "packet" to denote either. This simplifies flow control and buffer management in the receiver. Note that flow control at this level does not accurately reflect dynamic traffic bandwidth usage. This is a tradeoff between accuracy and simplicity. A hardware/software interface for segmented and unsegmented packets is described in commonly assigned and co-pending patent application entitled "High Performance Memory Based Communications Interface" Ser. No. 60/736,004, filed on Nov. 12, 2005, the entire specification of which is hereby incorporated herein in its entirety.

When a flow (connection) is established (Open and Open-Ack control messages, see FIG. 10 above), an initial number of tokens is provided to each end of the connection, based on the number of buffer space available at the respective opposite ends. When buffers are released at the receiving end after the received packets have been consumed, the receiving end may update the other end with additional tokens associated with the freed buffers. The receiving end may also update the other end with more tokens if the receiving end chooses to do so, based on current resource availability and the traffic characteristics of the flow. It is up to the receiving end to decide when to update the other end with additional tokens related to freed buffers and how. The receiving end may update the other side in batches (multiple tokens in one update message) and piggyback the update message on other packets flowing to the other end as with any other control messages. However, it must at all times keep the other end with at least one free token from its own point of view if there are any freed buffers allocated to this flow.

Loosely Controlled Traffic Category

For the loosely controlled category, there is really no end-to-end flow per se. Any node can send a packet to any other node as long as it knows the LFP address of the destination node. This is the same as the IP and Ethernet protocols. Since there is no established one-to-one correspondence, there is no flow control context setup. Although we could artificially set up a context for each communicating remote end point with an idle timer to guard its duration, it can be problem-prone in operation. First, the number of contexts required may be too large. Second, the timing for establishing and releasing of contexts may differ at the two ends, causing all kinds of potential state mismatch problems. In terms of sequence numbers, traffic between each pair of nodes can be considered to belong to a single stream, regardless of the type of payload. The sequence numbers are updated as if there were a flow.

A control solution for this type of traffic, according to embodiments of the present invention, is to have a relaxed flow control mechanism. Each node will start with a small default number of tokens for any other node it may send traffic to. This allows some amount of traffic to be initiated. The receiving end may dynamically reserve buffers from the loosely controlled pool (shared by all loosely controlled traffic) and grant tokens to remote nodes through Update Tokens messages. The granted tokens should be taken with a grain of salt. They only suggest the level of traffic the node is prepared to receive at the time. Contrary to what is described earlier for strictly controlled flows (i.e. proper flows), a node may reduce the number of tokens previously granted to the remote end by a new Update Tokens message. It may, for example, send an Update Tokens message to a remote node with 0 tokens granted to stop any further traffic at any time.

It is expected that a loosely controlled payload type will have its own flow control at a higher protocol level, for example, TCP flow control for TCP traffic. The control mechanism provided within LFP for connectionless traffic is intended to lessen but not to eliminate traffic flow problems in this category. The proposed simple method of control, using ad-hoc token distribution, allows multiple payload types in this category to share the same pool of receive buffers without unbounded interference between different payload types or between different source nodes: the receiver is always able to reduce, even stop, the traffic from any source node if that source is consuming more than its fair share of the (buffer) resources, or for any other reason.

Strictly Controlled (Proper) Flows

A receiving node (receiver) includes a buffer memory comprising a number of buffer locations (packet buffers) to serve one or more flows that are set up between the receiver and individual source nodes (sources). Each packet buffer is capable of holding a maximum size packet. There are further a number "destinationTokens" of tokens held by the receiver and a number "sourceTokens" of tokens held by each of the sources. Tokens are merely a conceptual notion—tokens are implemented simply in a register or memory location (called a "token pool") holding a value that represents the respective number of tokens. The sum of the tokens held by the receiver and the available tokens of all source nodes with respect to the given receiver cannot exceed the number of free packet buffers. A source cannot send a packet to the receiver unless it has an available source token that represents a packet buffer reserved at the destination. When the packet is sent the token is said to be consumed and remains unavailable while the packet is in transit and subsequently received and stored in a packet buffer at the receiver. A fresh token is created at the destination when the packet buffer is eventually freed (by the client of the LFP protocol). After a flow is established between an initiator node (for example the Node A in FIG. 10) and another node (for example the Node B in FIG. 10), with the control messages "Open" 606 and "OpenAck" 608, bidirectional traffic (data and flow control messages) 610 is exchanged between the nodes. Both nodes may be sending data traffic (data packets) to each other independently, i.e. both the Node A and the Node B may act as source node, as well as receiver node.

In FIG. 12 is shown a flow chart of an exemplary "Tokenized Transmit Packet" method 700, according to yet another embodiment of the present invention. The "Tokenized Transmit Packet" method 700 illustrates steps taken by a source node when sending a data packet in a strictly controlled flow:

decision step 702, "TC>THD1" (is token count greater than a first threshold?);

decision step 704, "TC=THD1" (is token count equal to the first threshold?);

decision step 706, "TC>THD2" (is token count greater than a second threshold?);

decision step 708, "TC>0" (is token count greater than zero?);

step 710, "Piggyback Update Tokens Message 1";

step 712, "Piggyback Update Tokens Message 2";

step 714, "TC:=TC−1" (decrement token count);

step 716, "Send Packet";

step 718, "Send Update Tokens Message 3"; and step 720, "Start Token Timer."

The "Tokenized Transmit Packet" method 700 applies to each direction independently, only one direction of traffic being described here.

Before the start of the bidirectional traffic phase 610, the source node (e.g. the Node A) has received a number of tokens (the initial "sourceTokens") from the receiver node (i.e. the Node B). The source initializes a memory variable "available source Token Count" (TC) when the flow is opened (i.e. from the field STkns 532 [FIG. 9c] of the format 520 of the OpenAck 608 control message), and tracks the available source token count (TC) for the established flow. First and second positive token thresholds (THD1 and THD2) may be predetermined values. The first token threshold THD1 is a higher threshold than the second token threshold THD2.

Before sending a data packet the available source token count TC is compared with the first and second positive thresholds THD1 and THD2 in the decision steps 702-708. If at least one source token is available, the token count TC is reduced by one (TC:=TC−1, step 714) and the packet is sent (step 716). The token count TC is thus decreased with each packet that is sent. It is increased only as a result of an "Update Tokens" control message received from the other end. If the token count TC is greater than the first threshold (TC>THD1, "Yes" from step 702), then the token count TC is decremented in the step 714, and the packet is sent in the step 716. If the token count is not greater than the first token threshold (TC>THD1, "No" from step 702), but equal to the first token threshold (TC=THD1, "Yes" from step 704), then a first "Update Tokens" control message is created and inserted as a piggyback message in the data packet (step 710, "Piggyback Update Message 1"). The actual token count TC is reported in the source tokens field (STkns 532 [FIG. 9e] of the format 524) of said first "Update Tokens" control message. This piggybacked first "Update Tokens" control message, when sent to the receiver along with the data packet, acts as a request for more tokens. If the token count TC is not greater than or equal to the first token threshold ("No" from steps 702 TC>THD1 and 704 TC=THD1), but greater than the second token threshold (TC>THD2, "Yes" from step 706) then the token count TC is decremented in the step 714, and the packet is sent in the step 716, without a piggyback "Update Tokens" control message. If the token count TC is not greater than or equal to the first token threshold ("No" from steps 702 TC>THD1 and 704 TC=THD1), and not greater than the second token threshold (TC>THD2, "No" from step 706), but is greater than 0 ("Yes" from the step 708 TC>0), then a second "Update Tokens" control message is created and inserted as a piggyback message in the data packet (step 712, "Piggyback Update Message 2"). The actual token count TC is reported in the source tokens field (STkns 532 [FIG. 9e] of the format 524) of said second "Update Tokens" control message. The piggybacked second "Update Tokens" control message, when sent to the receiver along with the data packet, acts as a request for more tokens.

Finally, if the token count TC is not greater than zero ("No" from step 708 TC>0) then no data packet can be sent, hence no piggyback is available. This situation may arise as a result of a higher than expected traffic load, possibly also due to a failure in a client protocol (e.g. LTP). In this case, an explicit third Update Tokens Control message is sent (step 718, "Send Update Tokens Message 3), and a token timer will be started (step 720, "Start Token Timer"). If the token timer should time out before new tokens are received in an "Update Tokens" control message from the receiver, the connection is deemed to be broken and the flow must be closed (using Close and CloseAck control messages 612 and 614, FIG. 10).

The receiver of the packets may issue an "Update Tokens" control message at any time, to refresh the tokens available at the source, but only if buffer space is available. In the preferred embodiment, the receiver only tracks the number of available packet buffers at the receiver, but does not track the number of tokens available at each source. An "Update Tokens" control message, to add tokens to the pool of available tokens at a source, is preferably only sent to the source after the source has requested extra tokens as described above (steps 710, 712, and 718). The receiver maintains a token pool, that is a number equal to or less than the number of free packet buffers, diminished by the number of outstanding tokens, i.e. tokens issued to sources. If the token pool is not empty, the receiver may send an "Update Tokens" control message to the source, to provide it with additional tokens. The number of tokens that are issued as a result of a request for tokens depends on the current size of the token pool:

If a large number of packet buffers are free and uncommitted, i.e. the token pool is large (a higher number than a first buffer threshold of 100 tokens for example) than a first quantity of tokens is issued (e.g. 50). It the size of the token pool is below the first buffer threshold, but larger than a second buffer threshold (of 20 tokens for example), then a second quantity of tokens is issued (e.g. 20). Finally, if the size of the token pool is below the second buffer threshold, then all remaining tokens may be issued.

As noted above, the source may issue an "Update Tokens" control message to the receiver when the source's available token count becomes low. In the embodiment described above, the source does not issue a request for tokens while the available token count is high, i.e. higher than the first token threshold (THD1 for example=25). When the first token threshold is reached, a request for tokens is sent (first piggyback Update Tokens control message, step 710). As a response, the receiver (assuming sufficient buffer space is available) will issue a batch of new tokens, for example a first quantity of 50. There is no need for the source, while still in possession of a number of tokens, to immediately request more tokens. On the other hand, the receiver may temporarily be short of buffer space and not respond with new tokens, or alternatively, the first token request was lost (note that control messages are not retransmitted, and are voided if sent in piggyback of retransmitted data packets, see above). As a result of the delay, the source may be sending more packets, gradually exhausting its supply of available tokens.

When the second token threshold (THD2 for example=5) is reached, it becomes more urgent to obtain new tokens. Thus to cover the case of a possible lost first Update Tokens control message, the source starts to add the second piggyback Update Tokens control message (step 712) to every packet sent until it runs out of tokens completely. The interplay between the steps 702-718 of the "Tokenized Transmit Packet" method 700 in a source node (e.g. the Node A, FIG. 10), and the response by the receiver node (e.g. the Node B) providing tokens as needed, ensures the unimpeded, efficient transmission of data packets in the case where the receiver is able to dispose of received packets at the rate the packets arrive.

In the present embodiment, no timers are used to enforce a bandwidth limit. Further embodiments envisage the use of timers for bandwidth enforcement. The LFP token control does not include monitoring of received traffic. This is done in the LTP layer (LFP and LTP interaction is described in the next section). Flow control is done both in LFP and LTP. LFP flow control is to ensure receive buffer availability and in the future may be enhanced to include bandwidth enforcement for certain flows. LTP flow control is about destination application congestion. The LTP regulates traffic generated at the source while monitoring the receiving queuing against the receiving application. If the receiving application is not consuming the received data quickly enough (many packets are queued), then the LTP will slow down the granting of tokens or even stop granting any more until the congestion is relieved. At the source end of a link (of LTP), the shortage of tokens will automatically result in the suspension of the sending task and therefore traffic slows down.

Another important point about LFP token granting format is that the receiving LFP can grant more tokens than the token field allows. LFP uses a reference point for token granting. LFP can use an advanced sequence number as the reference point through the flow context field. The purpose of this field is twofold: First, it removes any ambiguity such as with some other protocol as both sides may have a slightly different current view due to transport delay. Second, it allows an advanced sequence number to be used. This allows more tokens to be granted than allowable by the token field coding.

According to an embodiment of the present invention, constant token thresholds in the source (i.e. THD1 and THD2) and other constants (buffer thresholds in the receiver) are predetermined and selected on the basis of system size and speed. According to other embodiments, these thresholds may also be selected dynamically, based on system size and speed, as well as on the number of flows that share a receive buffer from time to time, and other appropriate packet traffic characteristics.

The LFP 308 is thus a protocol that may be deployed in the computational nodes 208 in the HPC system 200 (FIG. 5), to provide a network level communication service which is efficient and guarantees reliable, in-order transmission of data between the nodes. Once an LFP flow is opened between a pair of nodes, it may remain open indefinitely and thus effectively become part of the infrastructure that provides an efficient permanently available link between applications, to be used with other protocols including the LTP 306, which makes optimal use of the underlying reliability of the LFP 308.

Liquid Transport Protocol and Liquid Flow Protocol Interaction

Figure 13:
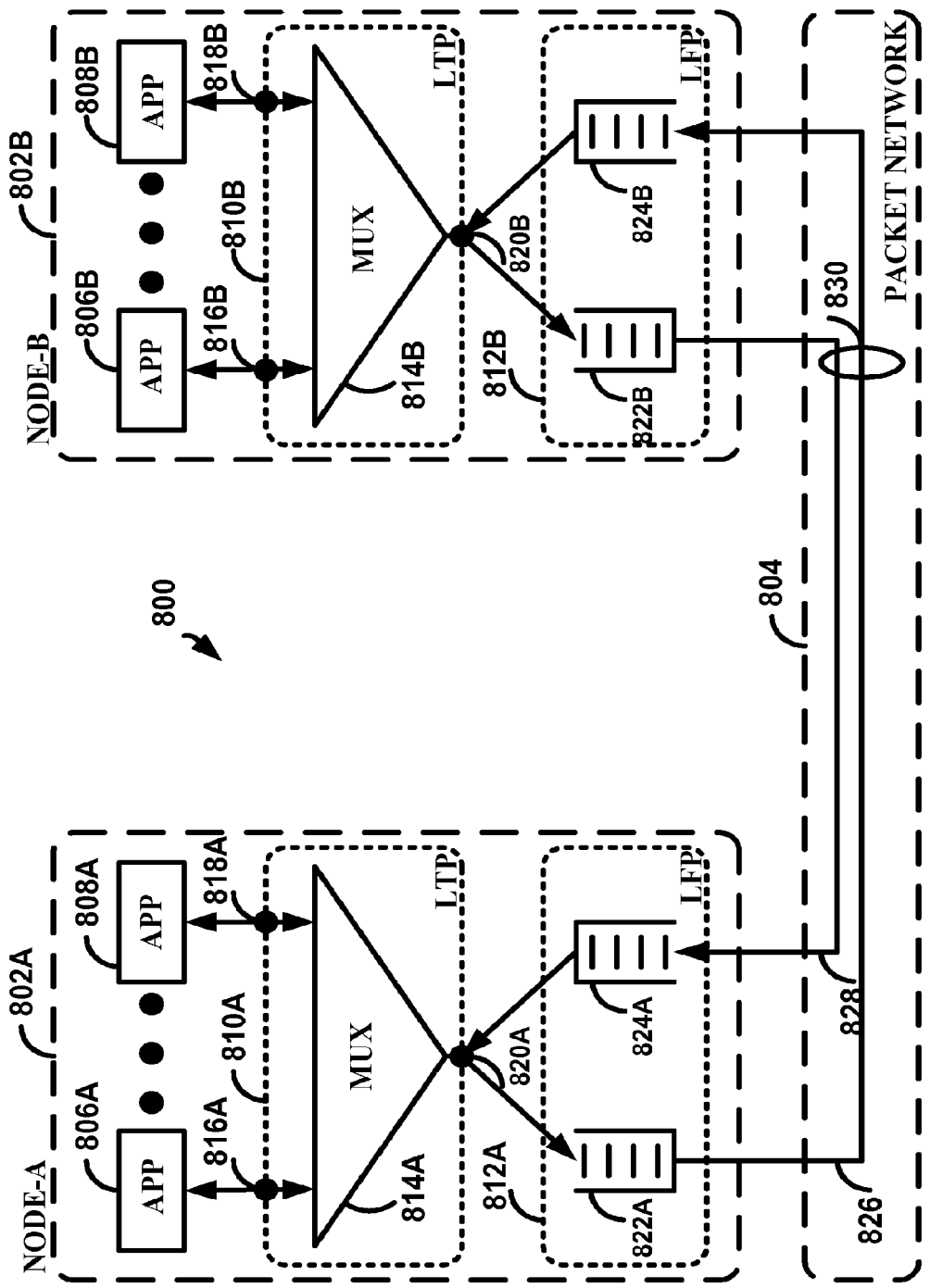
FIG. 13 is a data flow diagram 800 showing a number of LTP 306 connections being multiplexed over a single LFP 308 flow, according to an embodiment of the invention.

As shown above (FIG. 6), the Liquid Transport Protocol (LTP 306) may be advantageously inserted between the Liquid Flow Protocol (LFP 308) and the Application (304). In this way, the LFP 308 can provide very efficient and reliable packet connections (flows) between the computational hosts 206 (HPC system diagram FIG. 5), over which the LTP 306 provides packet connections between applications interfaces. A number of LTP 306 connections may be multiplexed over a single LFP 308 flow. This concept is illustrated in a data flow diagram 800 in FIG. 13.

The data flow diagram 800 comprises a first and a second node (computational host) 802A and 802B respectively and a packet network 804. The nodes 802A and 802B are also referred to as Node A and Node B respectively, and include applications 806A and 808A (in the Node A), and applications 806B and 808B (in the node B). The Nodes A and B further include instances of the LTP protocol 810A and 810B respectively, as well as instances of the LFP protocol 812A and 812B respectively. The Nodes A and B may include other applications and other protocols, not shown. The Nodes A and B may be nodes in the HPC system 200 (FIG. 5), the LFP instances 812A and 812B are implementations of the LFP 308 (FIG. 6) which has been described in detail above (FIGS. 7-12). The LTP instances 810A and 810B are implementations of the LTP 306 which will be described in greater detail below.

The LTP protocol instances 810A and 810B include multiplexers 814A and 814B respectively. The LTP protocol instance 810A in the Node A comprises application-side ports (ports) 816A and 818A, through which the multiplexer 814A is connected to the applications 806A and 808A respectively. Similarly in the Node B, the LTP protocol instance 810B comprises application-side ports (ports) 816B and 818B, through which the multiplexer 814B is connected to the applications 806B and 808B respectively. LTP protocol instances 810A and 810B further include network-side interfaces 820A and 820B through which the multiplexers 814A and 814B are connected to the LFP protocol instances 812A and 812B respectively. The LFP protocol instances 812A and 812B include send queues 822A and 822B respectively, and include receive queues 824A and 824B respectively.

The input of the send queue 822A and the output of the receive queue 824A are connected to the network-side interface 820A of the LTP protocol instances 810A. Similarly, the input of the send queue 822B and the output of the receive queue 824B are connected to the network-side interface 820B of the LTP protocol instances 810B.

The output of the send queue 822A in the Node A is connected to the input of the receive queue 824B in the Node B through a virtual wire 826 that passes through the packet network 804. Similarly, the output of the send queue 822B in the Node B is connected to the input of the receive queue 824A in the Node A through a virtual wire 828 that passes through the packet network 804. The virtual wires 826 and 828 comprise an LFP flow 830.

In functional terms, the data flow diagram 800 illustrates the communication between applications in different nodes, using the LTP and LFP protocols. For example the application 806A in the Node A may wish to communicate with the application 806B in the Node B. The LFP instances 812A and 812B are already in communication through the flow 830, as described in the previous chapter. It should kept in mind that the HPC system 200, to which the data flow diagram 800 refers, may include many more nodes, and many additional flows similar to the LFP flow 830 between any or all pairs of nodes.

The LFP instances 812A and 812B have (between them) opened the LFP flow 830 using Open and OpenAck control messages, and maintain the flow using the token based flow control and the selective acknowledgement and retransmission methods described above. The LTP protocol instances 810A and 810B may thus communicate with each other through their network-side interfaces 820A and 820B. For example, a packet may be sent from the network-side interface 820A in the Node A through the send queue 822A; the virtual wire 826; and the receive queue 824B, to the network-side interface 820B in the Node B. Since the LFP 308, as described above, provides reliable (i.e. including retransmission of lost packets) forwarding of packets, the LTP 306 (in the form of the LTP instances 810A and 810B) may treat the LFP flow 830 almost as if it were a direct connection over a wire, limited only in capacity.

On the application-side, the LTP 306 provides multiple interfaces, commonly termed "ports" (the application side ports 816A, 816B, 818A, 818B, and other ports not shown in the data flow diagram 800). Ports are numbered with a 16-bit port identifier (analogous to standard TCP usage). Although ports may be used to open LTP connections between applications as is common practice, ports are not referenced in each packet that is sent over an LTP connection once opened (unlike standard TCP). Rather a direct object reference is used, as described below. Furthermore, because the LTP 306 may run over the LFP 308 as shown, and the LFP 308 is already reliable, there is no need for the LTP 306 to implement a retransmission capability (again, unlike standard TCP), thus leading to considerable simplifications, and ultimately better performance. Additional advantages of the LTP 306 will become apparent from the detailed description of the protocol which follows.

Liquid Transport Protocol 306

LTP Protocol Summary

The LFP 308 as described above provides the network level communication service on the HPC system 200. It is efficient and guarantees reliable, in-order transmission of data between communicating nodes. The LTP 306 is used on top of the LFP 308, i.e. LTP packets or segments of LTP packets are carried as LFP payload 404 in LFP packets 400 (see FIG. 7). Like other transport protocols, the LTP 306 provides the per-node multiplexing capability to address different objects (e.g. applications) within a single node, see FIG. 13 above.

An LTP connection can be opened and closed over an existing strictly controlled LFP flow. An LTP connection can be considered to be an association of two LTP endpoints, identified by a port number and a node identity. An LTP endpoint may be involved in multiple connections as long as the other endpoints are distinct. The protocol also provides a mechanism to allow expedited delivery of out-of-band (OOB) messages. Such OOB messages may be used for various control purposes.

Although the LFP 308 already provides flow control, the LFP flow control applies to the flow as a whole which may carry more than one LTP connection and also other (non-LTP) traffic. The LTP 306 provides a simple per-connection flow control mechanism for relaxed traffic regulation. This mechanism is extremely simple to implement, and its purpose is mainly to prevent one connection from hogging or overwhelming the LFP flow that carries the connection, and thus avoid starving other connections within the same LFP flow. It is not meant to provide exact flow control, which is deemed to be unnecessary and overly expensive. Finally, the LTP 308 provides a keep-alive mechanism within the protocol itself. The protocol based keep-alive mechanism may help relieve LTP clients (applications) from the chore of maintaining a live connection.

While the LTP protocol uses a 16-bit port number to support multiplexing, a connection, once opened, can subsequently be referenced by a secure context object handle (an implementation of a Secure Object Handle described in the following section). This is done by associating LTP endpoints of a connection with secure context object handles.

Secure Object Handle

For any conversation to be meaningful and effective, there must be a clear context. Inter-communicating software systems need a precise context for communication. Such communication may be local (within the same processor) or remote (between processors). When a software system or component communicates with another, it may refer to the context which is understood by the counterpart by some kind of identifier (ID). Such IDs may take many different forms, such as a function provided by the counterpart to call, an index into a table maintained by the counterpart, or indeed a port number at the counterpart side when using certain communication protocols (e.g. TCP or UDP).

Regardless of what mechanism is used to refer to the context in multiparty communications in software, it can always be qualified by two attributes: performance and security. In general, these two attributes conflict with each other. For example, the operating system might allow a third-party (an application program) program to address an internal object (e.g. data belonging to a different program) directly on a local machine, by giving out the memory address. This proves to be the most efficient way in many cases. But in doing so, this could allow the third-party to ruin everything intentionally or unintentionally. Giving out the memory address of internal context objects suffers from another risk as well. Usually, an internal context object may need to be reused for new clients after the completion of the session with a previous client. However, the previous client may still hold the address and continue to access the context object due to honest design errors or for malicious purposes. If the communicating counterpart is a real third-party, local or remote, security becomes a key attribute. This is almost always true for remote communication. It can be true for local communication as well; for instance, a local server code designed to serve many unknown clients would not want to allow clients to directly access its internal objects or to call a client provided callback function. The inefficiency inherent in conventional solutions to processor to processor (application-to-application) communications through operating system kernels was described in the background section (FIGS. 1 to 4).

The LTP 306 includes a reference mechanism, based on a "Secure Object Handle" that provides both performance and security while at the same time offering great simplicity of implementation. The usage of a secure object handle (SOH) is illustrated in a SOH concept diagram 900, shown in FIG. 14. The SOH concept diagram 900 shows a "Trusted Domain" 902 (e.g. the kernel of an operating system) and a Client 904 (e.g. an application). The "Trusted Domain" 902 is linked with the Client 904 through a bidirectional interface 906 (e.g. a communications protocol or an OS application program interface [API]).

Shown inside the "Trusted Domain" 902 are a Context Object 908 and a Secure Object Handle 910. The Context Object 908 contains data (not explicitly shown) that is of interest to the Client 904, and an Allocation Stamp 912. The Secure Object Handle 910 is a triple consisting of an Address field, a Stamp field, and a Signature field. The Address field of the SOH 910 points at the memory address of the Context Object 908; the Stamp field of the SOH 910 contains the value of the Allocation Stamp 912; and the Signature field of the SOH 910 contains a value that is computed from the Address and Stamp fields with an integrity algorithm that is known within the "Trusted Domain" 902.

Figure 15:
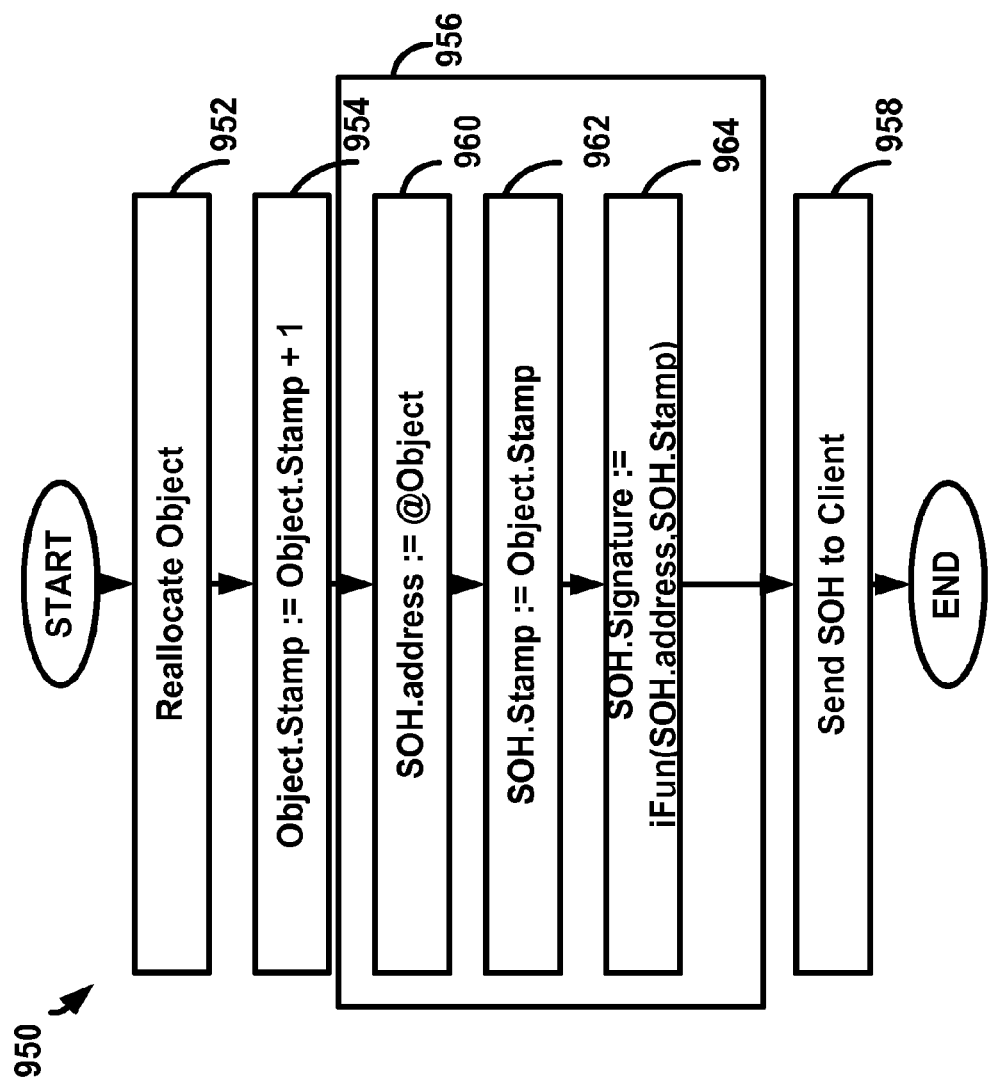
FIG. 15 is a flow chart of a "Make New Object" method 950, related to the SOH concept 900 of FIG. 14.

FIG. 15 shows a flow chart of a "Make New Object" method 950 showing steps executed in the "Trusted Domain" 902 when the Context Object 908 is created. This may occur for example when a session is started between the Client 904 and the "Trusted Domain" 902.

The "Make New Object" method 950, according to an embodiment of the present invention, may include the following successive steps:
step 952: "Reallocate Object";
step 954: "Object.Stamp:=Object.Stamp+1";
step 956: "Create SOH"; and
step 958: "Send SOH to Client."

In the step 952 "Reallocate Object", the context object 908 is allocated (for example, bound into a list of similar objects). In the step 954 "Object.Stamp:=Object.Stamp+1" the Allocation Stamp 912 of the context object 908 is incremented. Note that all context objects should have their Allocation Stamp field 912 reset to a known value (e.g. 0) on the initial allocation. Each subsequent allocation instance for a session (i.e. reallocation of the existing object) is then accompanied by an increment of the Allocation Stamp 912. Only the first instance of the context object needs to have the stamp set to 0. In this way, a stamp value of 0 is associated with the address of the object only once and therefore no confusion occurs afterwards.

In the step 956 "Create SOH" a corresponding secure object handle (SOH 910) is created. Creation of the SOH 910 may include the following three steps:
step 960: "SOH.address:=@Object";
step 962: "SOH.Stamp:=Object.Stamp"; and
step 964: "SOH. Signature:=iFun(SOH.address, SOH.Stamp)."

When the SOH 910 is created, in the first step (the step 960 "SOH.address:= @Object") the Address field of the SOH 910 is set to the start address of the Context Object 908; in the next step (the step 962 "SOH.Stamp:= Object.Stamp") the Stamp field of the SOH 910 is assigned from the Allocation Stamp 912 of the Context Object 908); and in third step (step 964 "SOH.Signature:=iFun(SOH.address,SOH.Stamp)") the Signature field of the SOH 910 is loaded with an integrity check value that is computed with a chosen integrity function (iFun) from the Address and Stamp fields of the SOH 910. The chosen integrity function may be based on one of many integrity algorithms of varying complexity and efficiency that are available from the cryptographic field. The chosen integrity function does not need to be disclosed to the Client 904.

Figure 14:
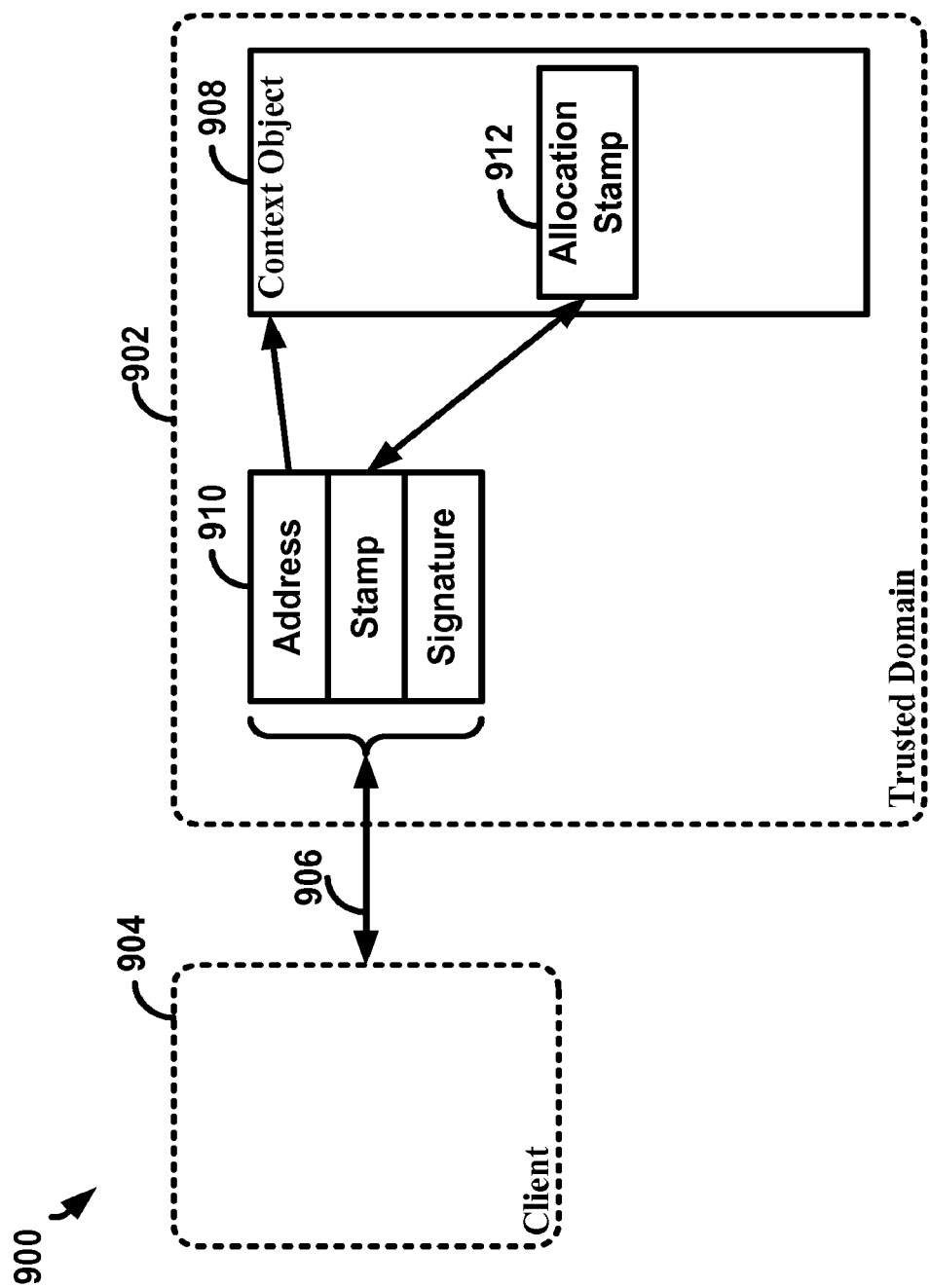
FIG. 14 illustrates a secure object handle (SOH) concept diagram 900, according to an embodiment of the invention.

In the step 958 "Send SOH to Client", the SOH 910 is conveyed to the Client 904 through the interface 906 (FIG. 14). A copy of the SOH 910 now exists in the Client 904, and the Client 904 may later present this handle in subsequent communication in order to access the Context Object 908. It should be noted that the Context Object 908 may only be one of many similar objects. With the SOH 910, the client possesses the actual memory address of the Context Object 908, and is thus able to access the object efficiently, without a need for searching.

Figure 16:
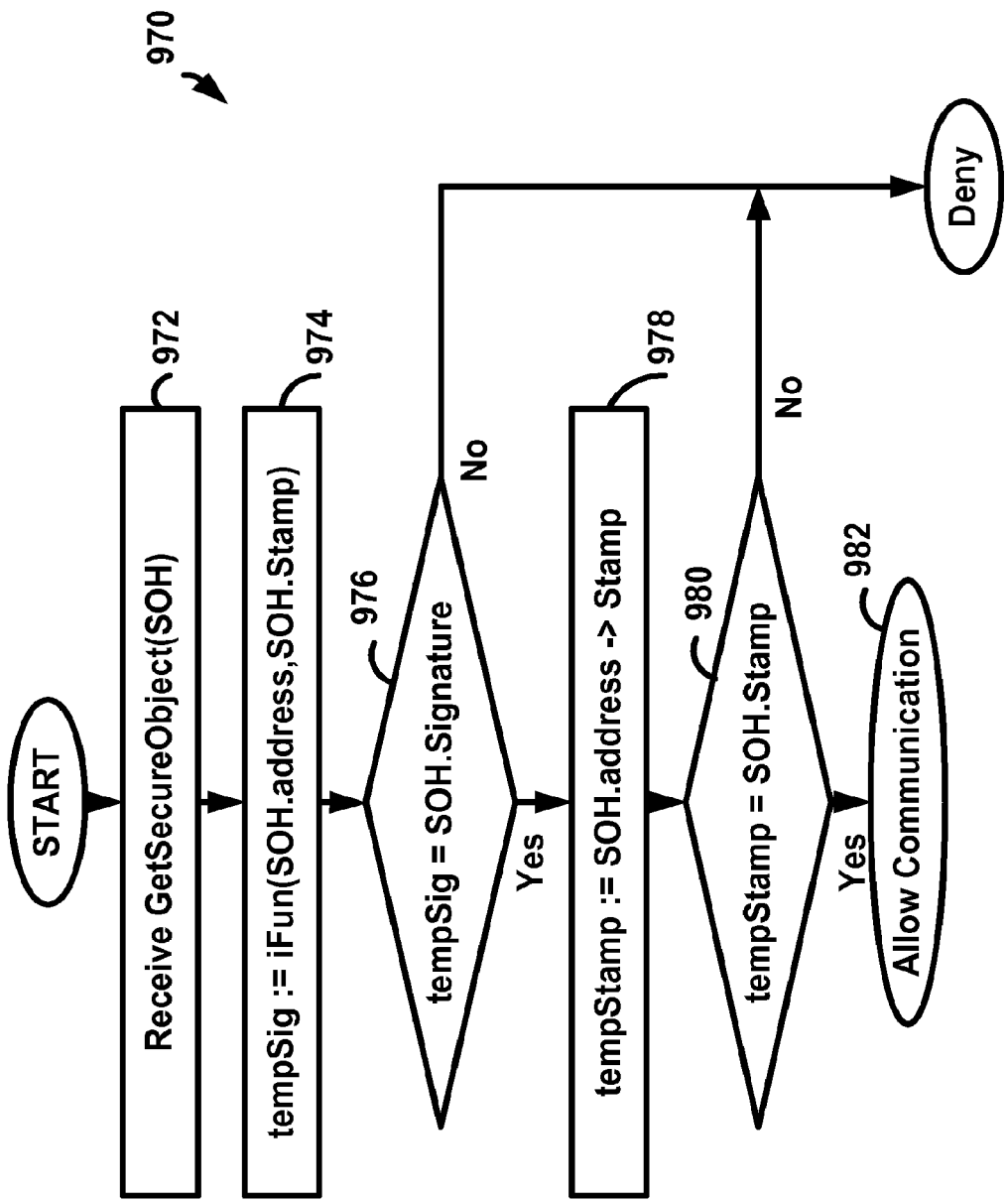
FIG. 16 is a flow chart of a GetSecureObject method 970, related to the SOH concept 900 of FIG. 14.

FIG. 16 shows a flow chart of a GetSecureObject method 970, according to a further embodiment of the present invention. The GetSecureObject method 970 may include steps executed in the "Trusted Domain" 902 when the Client 904 attempts to access the Context Object 908. The GetSecureObject method 970 receives a parameter (SOH) that identifies the requested object, and allows communication (e.g. by returning the address of the requested object to the Client 904). If the SOH parameter does not pass the integrity check, or if the requested object does not exist (e.g. no longer exists, as evidenced by a mismatch between the stamp values in the SOH parameter and in the object), the method fails (e.g. by returning NULL).

The GetSecureObject method 970 may include the following steps:
step 972: "Receive GetSecureObject(SOH)";
step 974: "tempSig:=iFun(SOH.address,SOH.Stamp)";
decision step 976 "tempSig=SOH.Signature" (is tempSig equal SOH.Signature?);
step 978: "tempStamp:=SOH.address→Stamp";
decision step 980 "tempStamp=SOH.Stamp" (is tempStamp equal SOH.Stamp?), and
step 982: "Allow Communication."

In the step 972 "Receive GetSecureObject(SOH)", the Client 904 presents a secure object handle (SOH) for communication with the "Trusted Domain" 902. The integrity of the SOH is checked by the "Trusted Domain" 902 in the steps 974 "tempSig:=iFun (SOH.address,SOH.Stamp)" and the decision step 976 "tempSig=SOH.Signature." In the step 974 "tempSig:=iFun (SOH.address,SOH.Stamp)", a temporary variable (tempSig) is computed by the "Trusted Domain" 902 using its chosen integrity function iFun, and then compared with the signature that is part of the SOH (SOH.Signature). If the integrity check fails ("No" from the step 976 "tempSig=SOH.Signature") the communication request is denied (fails). If the integrity check passes ("Yes" from the step 976 "tempSig=SOH.Signature") then the Stamp contained in the presented SOH is compared with the Allocation Stamp 912 that is held in the Context Object 908 as follows: a copy (a temporary variable tempStamp) of the Allocation Stamp 912 is obtained from the Context Object 908 by using the object address from the SOH (SOH.address) as a pointer to the Context Object 908 and accessing the Allocation Stamp field 912 (SOH.address→Stamp) in the step 978 "tempStamp:=SOH.address→Stamp." The value of the temporary variable tempStamp is then compared with the value of the Stamp field in the presented SOH in the step 980 "tempStamp=SOH.Stamp." Communication is allowed (the step 982 "Allow Communication") only if the stamps are found to be identical ("Yes" from the step 980 "tempStamp=SOH.Stamp"), otherwise ("No" from the step 980 "tempStamp=SOH.Stamp") the communication request is denied (fails).

The computation of the signature ensures (with a high probability) that a presented secure object handle (SOH) is valid, i.e. not corrupted inadvertently or forged. The comparison of the stamp fields helps make sure that a client holding a previously valid handle will not be able to accidentally access the re-allocated context object (reallocated for different purposes).

An example of the use of a secure object handle is within the LTP 306 that is described in more detail in the following section. When used in the LTP 306, a secure object handle is created once when a connection is opened, the secure object handle referencing an allocated connection context object. The referenced connection context object may subsequently be accessed numerous times, i.e. with each LTP packet sent or received.

As can be seen, the context object can be addressed directly without searching of any sort. Note that there is no memory access needed other than the data (including the SOH) presented by the client, and the Stamp value of the context object. Since the data presented by the client and the context object are to be accessed anyway, there is no additional cache efficiency degradation. The runtime cost is mainly associated with the integrity checking. The choice of algorithm for integrity function may be based on the perceived security risk and the targeted performance.

Note that although we have shown the secure context object handle as a triple, they do not need to be a single data structure with triple fields. The three fields could be physically dispersed, for example, over a communication protocol header (packet header). All that is required is the presence but not the form of these three fields. The lengths of these fields may also vary from implementation to implementation.

An embodiment of the present invention uses the following definitions:

The Address field is a 64-bit value, to suit a 64-bit CPU such as, for example, the Athlon 64 processor from AMD.

The Stamp field is a 3-bit value, allowing up to 8 sequential reallocations without confusion. This is deemed to be sufficient for the LTP 306 and helps conserve LTP header space.

The Signature field is 16-bits long and the integrity algorithm chosen may be a simple 16-bit Exclusive-OR over Address and Stamp. Note that the integrity protection is mainly for covering implementation flaws and hardware failures, and this simple integrity algorithm is deemed to be more than sufficient. Furthermore, this integrity algorithm can be executed very efficiently, requiring only three consecutive CPU instructions:

a 32-bit Exclusive-OR of the upper and the lower 32 bits of the Address field, yielding a 32-bit result;

a 16-bit Exclusive-OR of the upper and the lower 16 bits of the 32-bit result, yielding a 16-bit result; and a further 16-bit Exclusive-OR of the 16-bit result with the Stamp field, yielding the Signature value.

Note that the integrity function used to check the validity of a secure object handle (SOH) resides in the domain that generates the SOH. A client receiving an SOH does not need to, and should never, check the validity of a secure object handle. The client should only use it as received. The client should not make assumptions about the integrity function used. This is true even though the same integrity algorithm may be specified and used at both ends. But making such assumptions may create forward compatibility problems. For example, in the process of an in-service upgrade, an un-upgraded node may continue to use the older algorithm while the newly upgraded node may have started using a new algorithm. As a result, they may not be able to successfully continue communication even if they have been designed to support in-service upgrade otherwise.

LTP Packet Definitions

The preferred embodiment of the LTP 306 comprises a number of control packet types and two forms of data packet types. LTP control packets are used to set up and release association of communication counterparts over an LFP flow as well as to maintain such associations. The data packets are used to carry user data end to end. A first form of LTP data packets comprises a conventional payload component for this purpose. A second form of LTP data packets may carry a limited amount of user data within the header as immediate data for highly efficient transfer of small user data. The packet headers of all LTP packet types include the fields of a Secure Object Handle (SOH).

LTP Control Packet Formats

Figure 17:
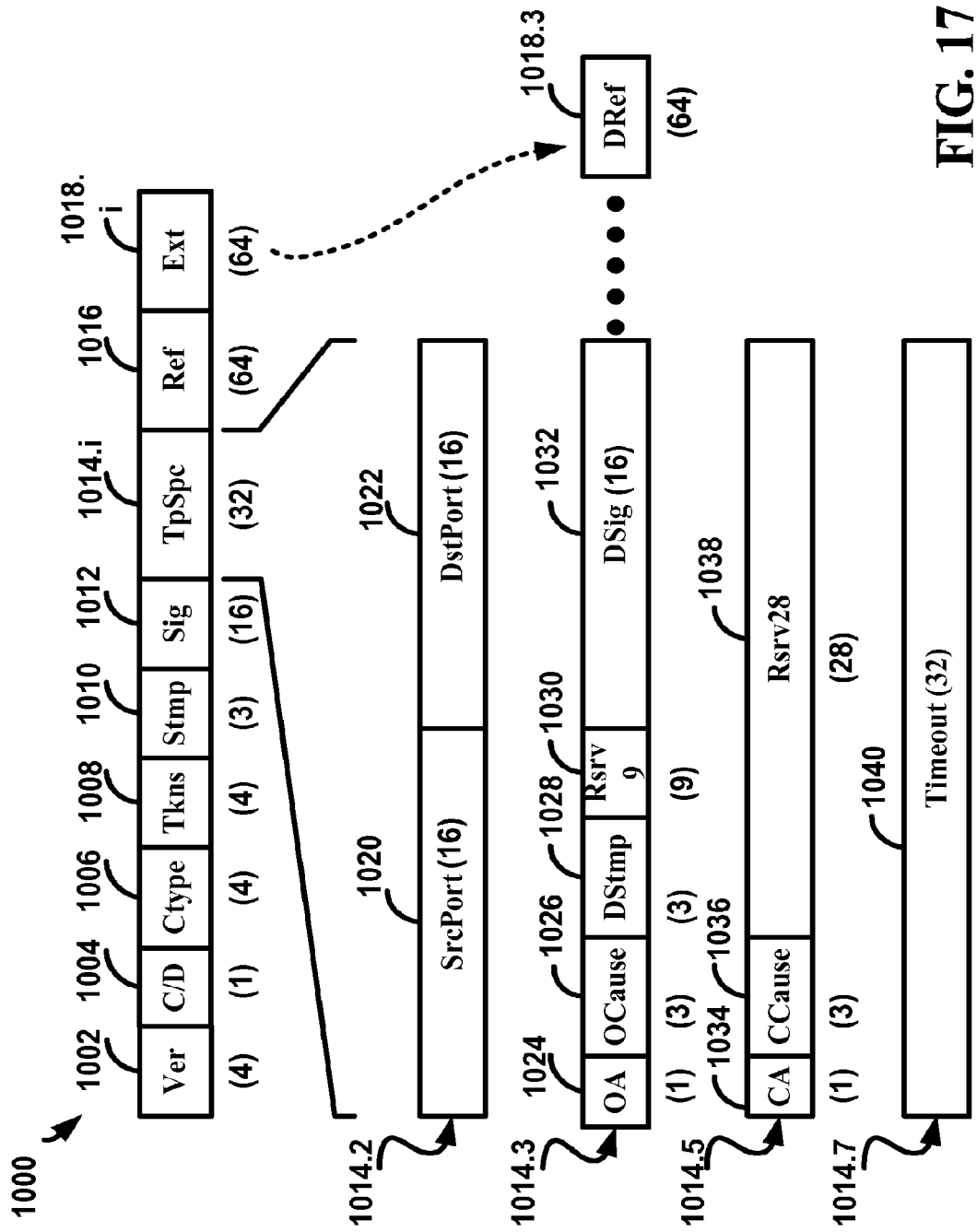
FIG. 17 is a generic LTP control packet format 1000 of the LTP 306 of FIG. 6.

The LTP control packet types according to embodiments of the present invention are described with the aid of format diagrams shown in FIG. 17. Shown in FIG. 17 is a generic LTP control packet format 1000, including fields which are common to all LTP control packet types. The fields of the generic LTP control packet format 1000 (with the size in bits of each field being indicated in the FIG. 17 in brackets adjacent to each field) are:

1002: a 4-bit Version field (Ver);
1004: a 1-bit Control/Data field (C/D);
1006: a 4-bit LTP Control Packet Type field (CType);
1008: a 4-bit Tokens field (Tkns);
1010: a 3-bit Secure Object Handle stamp field (Stmp);
1012: a 16-bit Secure Object Handle signature field (Sig);
1014.$i$: a 32-bit Control packet type specific field (TpSpc);
1016: a 64-bit Secure Object Handle address reference field (Ref); and
1018.$i$: a 4-bit an optional 64-bit extension field (Ext).

The version field (1002 Ver) is set to 0 in the present version of the protocol. Other versions of the protocol may be developed in the future, and the version field 1002 allows the CPU to select corresponding protocol handlers, even if different versions of the protocol run on the same system. The Control/Data field (1004 C/D) is set to 0 in all LTP control packet types. The type of an LTP control packet is indicated in the LTP Control Packet Type field (1006 CType). The following type values and their corresponding LTP Control Packet types are defined in the version 0 of the LTP, all other type values are reserved for use in future versions of the protocol:

2 LTP-Open;
3 LTP-OpenAck;
4 LTP-Close;
5 LTP-CloseAck;
6 LTP-UpdateTokens;
7 LTP-KeepAlive; and
8 LTP-Finished.

The Tokens field (1008 Tkns) indicates the number of tokens that the sender of the LTP control packet grants to the receiver, for additional data packets to be sent from the receiver of the control packet to the sender, from the time the receiver has received this control packet. Granted tokens are NOT accumulative. Tokens are granted in every LTP control packet and every LTP data packet. The main purpose of this simple control mechanism is to prevent any one LTP client from swamping the receiving LTP protocol entity (a recipient LTP client) for the connection. Note that the LFP 308 already has its own flow control mechanism, however at the LFP traffic flow level. When multiple LTP clients share the same LFP flow, it is possible that one LTP client could overrun the LFP flow in terms of available tokens. As a result, other LTP clients may not get their fair share of bandwidth (of the LFP flow) if the traffic is not regulated at the LTP level. Furthermore, if the recipient LTP client is not checking its incoming traffic for a long time (because it may be busy with some processing or have gone into an infinite loop due to a programming error), and if in the meantime the sending LTP client continues to send traffic towards the recipient LTP client, then other LTP clients could be completely starved for a long time or forever. The simple LTP token mechanism requires the recipient LTP client to explicitly and frequently grant (non-cumulative) tokens to the sending LTP client, thus ensuring that a sending LTP client can only send traffic at approximately the rate the recipient LTP client requests.

The three fields 1010 Stmp (3 bits), 1012 Sig (16 bits), and 1016 Ref (64 bits) together represent a Secure Object Handle (SOH). They are shown enhanced in heavy outline in the FIG. 17. The receiver of an LTP control packet will drop the packet if the integrity verification fails (see the GetSecureObject method 970, FIG. 16). The Control-packet type-specific field (1014.*i*TpSpc) is interpreted according to each different LTP control packet types.

LTP-Open Control Packet

A LTP-Open control packet may include the fields of a generic LTP control packet 1000 with the LTP Control Packet Type (CType 1006) field set to 2. The Control-packet type-specific field (1014.*i*TpSpc) of the LTP-Open control packet is interpreted as an LTP-Open specific field 1014.3 shown in the FIG. 17. The LTP Open specific field 1014.2 comprises two 16-bit fields, a source port field 1020 (SrcPort) and a 16-bit destination port field 1022 (DstPort). The optional 64-bit extension field (Ext 1018.*i*) is not used. The LTP-Open control packet (the LTP control packet 1000 with CType=2, and the LTP Open specific field 1014.2) may be sent as an LTP-Open request by an initiator to a target (recipient or destination). The LTP-Open request is a request to open an LTP connection between the initiator and the recipient within the LFP flow in which the LTP-Open control packet is sent. The connection is requested to be between the two end points identified by the SrcPort 1020 and the DstPort 1022. The SrcPort 1020 and the DstPort 1022 are source and destination port numbers from the initiator's point of view.

The initiator should have allocated a Connection Context Object (an instance of the Context Object 908) for the connection to be open. A secure context object handle SOH (an instance of the SOH 910) referencing this connection context object is included in the Ref 1016, Stmp 1010, and Sig 1012 fields of the LTP-Open control packet. This allows the target (destination receiving the LTP-Open control packet) of the LTP-Open request to refer to this request, and to this connection if it is established, in future communications with the SOH for direct access, instead of the port numbers (SrcPort 1020 and DstPort 1022). This mechanism allows the initiator to be able to locate the connection object 910 without any searching in handling any correspondence (i.e. data packet transmission etc.) with the destination in the future.

The Initiator of the LTP-Open control packet grants, in the tokens field Tkns 1008, to the destination (target) the number of tokens to throttle the data traffic from the target. The target is not allowed to send more packets than the number of packets equal to the Tkns 1008 value within this connection until subsequent grants are received. Subsequent token grants are carried in subsequent packets. Note that LTP token grants are NOT cumulative. The target interprets each received grant as the new total of available tokens from the time of arrival. Both the token grantor and grantee must be prepared to handle the side effects of such a relaxed token granting mechanism. For example, the grantor must be aware that there can be packets queued along the path, and that the grantee will always receive the grant at a later time than when the grantor sent it. This means that the grantor can receive more packets from the grantee than the number of tokens granted, after the time at which the tokens were granted. On the other hand, the token grantee must be aware that it may receive a subsequent grant, which actually revokes a previous grant (say, a new 0-token grant may be received before the previous grant is consumed).

Despite of the side effects of this relaxed token granting mechanism, the implementation can be actually very simple. The grantor may simply monitor the queue of received packets and decide if it wants to give out any more tokens or stop the grantee from sending any further traffic. No accounting is required. The essence is to allow maximum traffic to flow without swamping the underlying LFP flow or starving other LTP clients (users) of the same LFP flow.

LTP-OpenAck Control Packet

A LTP-OpenAck control packet comprises the fields of a generic LTP control packet 1000 with the LTP Control Packet Type (CType 1006) field set to 3. The Control-packet type-specific field (1014.*i*TpSpc) of the LTP-OpenAck control packet is interpreted as an LTP-OpenAck specific field 1014.3 shown in the FIG. 17. The optional 64-bit extension field (Ext 1018.*i*) is used in the LTP-OpenAck control packet and interpreted as a 64-bit destination SOH address reference 1018.3 (DRef). The LTP-OpenAck specific field 1014.3 may include the following fields:

1024: a 1-bit Open Acknowledgement field (OA);
1026: a 3 bit Open Cause field (OCause);
1028: a 3 bit destination SOH stamp field (DStmp);
1030: a 9-bit reserved field (Rsrv9); and
1032: a 16 bit destination SOH signature field (DSig).

The three fields 1028 DStmp, 1032 DSig, and 1018.3 DRef together represent a Destination Secure Object Handle (DSOH). They are shown enhanced in heavy outline in the FIG. 17. The LTP-OpenAck control packet allows the target (i.e. the recipient) of an LTP-Open control packet (request) to acknowledge the receipt of the request to the connection open initiator. The SOH (Ref 1016, Stmp 1010, Sig 1012) received in the LTP-Open control packet identifies the connection context object (an instance of the Context Object 908) that exists at the initiator of the LTP-Open request. These fields are copied from the received LTP-Open control packet into the corresponding fields of the LTP-OpenAck control packet.

The destination (the recipient of the LTP-Open control packet) should allocate a Destination Connection Context Object (an instance of the Context Object 908) when it accepts the connection request. A destination secure connection context object handle (DSOH) references the Destination Connection Context Object. The three values of the DSOH are inserted in the DRef 1018.3, DStmp 1028, and DSig 1032 fields of the LTP-OpenAck control packet. The DSOH identifies the connection context object at the target (recipient) of the LTP-Open request if the LTP-Open request is accepted, and undefined otherwise. The LTP-Open initiator will use the DSOH for any future correspondence with the target over the connection thus established.

The Tkns field 1008 of the LTP-OpenAck control packet is set to the number of tokens granted to the initiator of the connection if the LTP-Open request is accepted, and undefined otherwise. The Open Acknowledgement field (OA 1024) of the LTP-OpenAck control packet is set to "1" if the LTP-Open request is accepted, and set to "0" otherwise. The Open Cause field (OCause 1026) is set "0" if the LTP-Open request is accepted. If the LTP-Open request is not accepted, then the OCause field 1026 is set to one of the following cause values:

1: Memory is temporarily not available;
2: Communication resource is not available;
3: The connection (identified by the SOH fields 1010, 1012, and 1016) already exists;
5: Remote not available; and
6: Other failures.

The Rsrv9 field 1030 should be set to 0 by the sender and ignored by the receiver.

LTP-Close Control Packet

A LTP-Close control packet comprises the fields of a generic LTP control packet 1000 with the LTP Control Packet Type (CType 1006) field set to 4. The Control-packet type-specific field (1014.*i*TpSpc) of the LTP-Close control packet is not used and should be set to 0. The optional 64-bit extension field (Ext 1018.*i*) is not used. The LTP-Close control packet allows either end of an existing LTP connection to request to close the connection. The secure context object handle SOH (the Ref 1016, Stmp 1010, and Sig 1012 fields of the LTP-Close control packet) identifies the connection context object at the recipient of the close request. The secure context object handle is subject to integrity verification by the recipient, as described in FIG. 16.

LTP-CloseAck Control Packet

A LTP-CloseAck control packet may include the fields of a generic LTP control packet 1000 with the LTP Control Packet Type (CType 1006) field set to 5. The Control-packet type-specific field (1014.*i*TpSpc) of the LTP-CloseAck control packet is interpreted as an LTP CloseAck specific field 1014.5 shown in the FIG. 17. The optional 64-bit extension field (Ext 1018.*i*) is not used.

The LTP CloseAck specific field 1014.5 comprises the following fields:

1034: a 1-bit Close Acknowledgement field (CA);
1036: a 3 bit Close Cause field (CCause); and
1038: a 28-bit reserved field (Rsrv28).

The LTP-CloseAck control packet allows the recipient of an LTP-Close control packet (a close request) to reply to the requester. The Tkns field 1008 of the LTP-CloseAck control packet is set to 0. The secure context object handle SOH (the Ref 1016, Stmp 1010, and Sig 1012 fields of the LTP-CloseAck control packet) identifies the connection object at the connection close requester. If the LTP-CloseAck is negative as described below, the SOH is directly copied from the corresponding fields in the received LTP-Close control packet. The Close Acknowledgement field (CA 1034) indicates if the acknowledgment is positive (CA=1) or negative (CA=0). The Close Cause field (CCause 1036) is set "0" if the LTP-Close request is accepted (CA=1). If the LTP-Close request is not accepted (CA=0), then the CCause field 1036 is set to one of the following cause values:

4: Invalid handle received, i.e. the SOH (the Ref 1016, Stmp 1010, and Sig 1012 fields of the LTP-Close control packet) does not pass integrity verification; and
6: Other failure.

The Rsrv28 field 1038 is set to 0 by the sender of the LTP-CloseAck control packet and ignored by the receiver.

LTP-UpdateTokens Control Packet

A LTP-UpdateTokens control packet may include the fields of a generic LTP control packet 1000 with the LTP Control Packet Type (CType 1006) field set to 6. The Control-packet type-specific field (1014.*i*TpSpc) of the LTP-UpdateTokens control packet is not used and should be set to 0. The optional 64-bit extension field (Ext 1018.*i*) is not used. The LTP-UpdateTokens control packet allows the sender to explicitly grant tokens to the receiver. In most cases, there is no need to send LTP-UpdateTokens packets because all LTP packets carry a Tkns field 1008 and can serve the purpose implicitly granting tokens to the receiver. The LTP-UpdateTokens control packet may be used in cases when there are no other packets going in that direction. The Tkns field 1008 carries the new grant of tokens to the destination.

The secure context object handle SOH (the Ref 1016, Stmp 1010, and Sig 1012 fields of the LTP-UpdateTokens control packet) identifies the connection object at the recipient, and is subject to integrity verification. If the integrity verification fails at the recipient of a LTP-UpdateTokens control packet, the recipient will drop the received LTP-UpdateTokens control packet.

LTP-KeepAlive Control Packet

A LTP-KeepAlive control packet may include the fields of a generic LTP control packet 1000 with the LTP Control Packet Type (CType 1006) field set to 7. The Control-packet type-specific field (1014.*i*TpSpc) of the LTP-KeepAlive control packet is interpreted as a 32-bit Timeout field 1040 shown in the FIG. 17. The optional 64-bit extension field (Ext 1018.*i*) is not used. The LTP-KeepAlive control packet is used as a heartbeat to the destination with the heartbeat rate being dynamically adjustable. Each LTP-KeepAlive control packet both serves as one heartbeat to the destination and as a request to the destination for the next heartbeat from the destination. Normal incoming traffic also serves as incoming heartbeat. The Timeout field 1040 indicates the maximum time the node, having sent a LTP-KeepAlive control packet, will wait for the heartbeat from the destination. The receiver of a LTP-KeepAlive control packet should respond with one packet within the time specified by the timeout (1040) value. The timeout value is preferably specified as a number of microseconds. The secure context object handle SOH (the Ref 1016, Stmp 1010, and Sig 1012 fields of the LTP-KeepAlive control packet) identifies the connection object at the recipient, and is subject to integrity verification. If the integrity verification fails at the recipient of a LTP-KeepAlive control packet, the recipient will drop the received LTP-KeepAlive control packet. If the value of Timeout is set to 0, the destination is no longer required to send in any traffic.

Note: In the implementation of a Keep Alive feature, using LTP-KeepAlive control packets, transmission delays and network congestion should be taken into account. It would not make sense to immediately respond to a LTP-KeepAlive packet with a LTP-KeepAlive in the opposite direction unless the Timeout value calls for it. If both sides always immediately responded thus, an unnecessarily high rate of LTP-KeepAlive Ping-Pong would ensue. On the other hand, the responder should not wait for the maximum duration of the timeout value before responding (with a LTP-KeepAlive if there is no normal traffic to serve the purpose) because the round-trip transmission delay may cause the connection to time out.

LTP-Finished Control Packet

A LTP-Finished control packet may include the fields of a generic LTP control packet 1000 with the LTP Control Packet Type (CType 1006) field set to 8. The Control-packet type-specific field (1014.*i*TpSpc) of the LTP-Finished control packet is not used and should be set to 0. The optional 64-bit extension field (Ext 1018.*i*) is not used. The LTP-Finished control packet allows the sender to inform the destination that it has completed all transmission of data and will not send any more data hereafter. The LTP-Finished control packet does not trigger the closure of the connection. The sender may continue to receive data from the remote end and the remote end may continue to transmit data. The LTP-Finished control packet only changes the connection from the full duplex state to a simplex state. If both ends send their own LTP-Finished packet, the connection enters a zombie state and lingers. No user data, however, can be sent over this connection anymore. The connection still requires closure by using the LTP-Close and LTP-CloseAck control packets. The secure context object handle SOH (the Ref 1016, Stmp 1010, and Sig 1012 fields of the LTP-Finished control packet) identifies the connection object at the recipient, and is subject to integrity verification. If the integrity verification fails at the recipient of a LTP-Finished control packet, the recipient will drop the packet. The Tkns field 1008 carries a new grant of tokens to the destination.

LTP Data Packet Format

Figure 18:
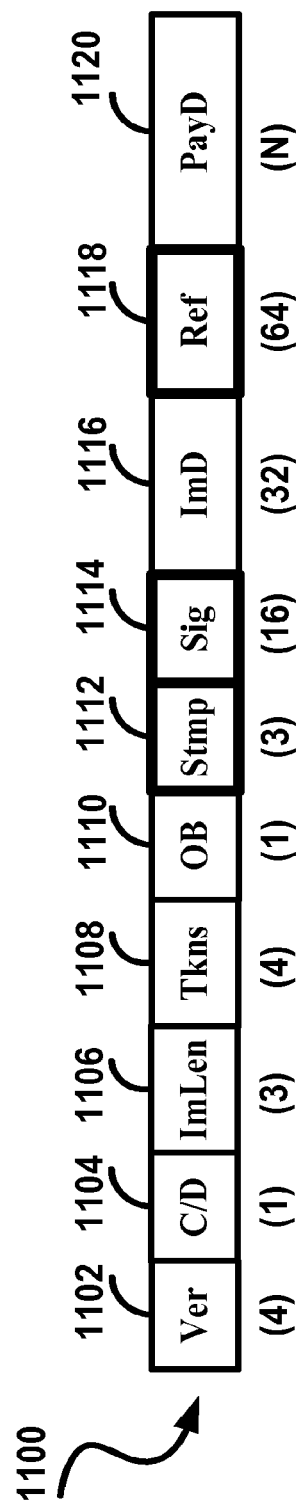
FIG. 18 shows the format of a LTP data packet 1100, according to an embodiment of the present invention.

The format of a LTP data packet 1100 is shown in FIG. 18. The LTP data packet 1100 may, according to an embodiment of the present invention, include the following fields:

1102: a 4-bit Version field (Ver);
1104: a 1-bit Control/Data field (C/D);
1106: a 3-bit Immediate Length field (ImLen);
1108: a 4-bit Tokens field (Tkns);
1110: a 1-bit Out-of-Band field (OB);
1112: a 3-bit Secure Object Handle stamp field (Stmp);
1114: a 16-bit Secure Object Handle signature field (Sig);
1116: a 32-bit Immediate Data field (ImD);
1118: a 64-bit Secure Object Handle address reference field (Ref); and
1120: an optional Payload Data field (PayD).

The format of the LTP data packet 1100 (FIG. 18) is similar to the format of the generic LTP control packet format 1000 (FIG. 17), and like-named fields in both formats fulfill similar functions. The version field (1102 Ver) of the LTP data packet is set to 0 in the present version of the protocol, the same as in LTP control packets. The Control/Data field (1104 C/D) is set to 1 in all LTP data packets (c.f. set to 0 in LTP control packets). The Tokens field (Tkns 1108) of the LTP data packet is used to grant tokens to the recipient of the LTP data packet, in the same way as the Tokens field (Tkns 1008) of the LTP control packets.

A secure context object handle SOH comprising the Ref 1118, Stmp 1112, and Sig 1114 fields of the LTP data packet identifies the present connection context object (an instance of the context object 908) in the recipient in the same way as the corresponding fields (the Ref 1016, Stmp 1010, and Sig 1012 fields) of the LTP control packets. The Out-of-Band field (OB 1110) of the LTP data packet is set to 0 for regular LTP data packets. It may be set to 1 to indicate that the packet is an out-of-band packet, and that the data carried by this LTP data packet is of an urgent nature. The recipient should expedite the delivery of the packet, potentially out of order. An example of the use of the out-of-band packet is for signaling.

The Immediate Length field (ImLen 1106) of the LTP data packet indicates the number (0 to 4) of immediate data bytes present in the 32-bit Immediate Data field (ImD 1116) of the present LTP data packet. When immediate data are present (ImLen greater than 0) the optional Payload Data field (PayD 1120) should not be used. Without immediate data present (ImLen equal 0), the optional Payload Data field (PayD 1120) may contain N bytes of data, where N may range from 0 to an upper limit that is imposed by the underlying flow protocol (LFP 308). Note that no "packet length" information is provided in the LTP data packet itself.

Embodiments of the present invention are related to the use of one or more high-performance computer (HPC) systems in which communication of data is enabled from a kernel of an operating system to a client. According to one embodiment, the computer-implemented methods of enabling communication of data from a kernel of an operating system to a client may be provided by one or more computer systems in response to processor(s) executing sequences of instructions contained in memory. Such instructions may be read into memory from a computer-readable medium, such as a data storage device. Execution of the sequences of instructions contained in the memory may cause the processor(s) to perform the steps and have the functionality described herein. In alternative embodiments, hard-wired circuitry may be used in place of or in combination with software instructions to implement the claimed embodiments of the present inventions. Within the context of this document, a 'computer-readable medium' may be or include any means that can contain, store, communicate, propagate or transport a program or application that implements an embodiment of the present invention for use by or in connection with a computerized system, apparatus, or device. Indeed, the computer readable medium may be or include (but is not limited to), for example, an electronic, magnetic, optical, electromagnetic, infrared, or semi-conductor system, apparatus, device, or propagation medium. More specific examples (a non-exhaustive list) of computer-readable media may include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (such as a CD or DVD-ROM, for example) or other data carriers.

While the foregoing detailed description has described preferred embodiments of the present invention, it is to be understood that the above description is illustrative only and not limiting of the disclosed invention. Those of skill in this art will recognize other alternative embodiments and all such embodiments are deemed to fall within the scope of the present invention. For example, other parallel programming models and languages may be implemented within the context of the present inventions such as, for example, MPI directly under LFP, i.e. without LTP. Those of skill in this art may devise other such variations. Thus, the present invention should be limited only by the claims as set forth below.

What is claimed is:

1. A computer-implemented method to enable communication of data from a kernel of an operating system to a client, comprising:

providing a context object that includes the data to be accessible to the client;

providing the kernel with a secure object handle, the secure object handle including an actual address of the context object and being particular to the context object;

sending, by the kernel, the secure object handle to the client over a bidirectional interface;

receiving, by the kernel, the secure object handle from the client over the bidirectional interface, indicating that the client requires access to the data in the context object, and checking an integrity of the secure object handle in the kernel and allowing access to the data by the client in response to the integrity check being successful.

2. The method of claim 1, wherein the context object includes a unique allocation stamp and wherein the secure object handle includes a field configured to store a value of the allocation stamp.

3. The method of claim 2, wherein the checking the integrity of the secure object handle includes disallowing access to the data by the client in response to the value of the allocation stamp in the secure object handle received from the client not matching the unique allocation stamp in the context object.

4. The method of claim 2, further comprising making the data unavailable to the client by changing the unique allocation stamp.

5. The method of claim 1, in response to a successful integrity check, accessing, by the client, the data at the address of the context object in the received secure object handle.

6. The method of claim 1, wherein the checking the integrity of the secure object handle comprises at least one Boolean Exclusive OR (XOR) operation.

7. The method of claim 1, wherein the checking the integrity of the secure object handle comprises a Cyclic Redundancy Check (CRC).

8. The method of claim 1, wherein only the kernel carries out the checking the integrity of the secure object handle.

9. The method of claim 1, wherein the secure object handle includes a signature and wherein checking the integrity of the secure object handle includes verifying an integrity of the signature.

10. The method of claim 9, further comprising generating a signature of the secure object handle as a predetermined function of a value of the unique allocation stamp and the address of the context object.

11. The method of claim 9, wherein the providing the kernel with the secure object handle comprises incorporating at least the address of the context object and the signature in a header of a packet configured according to a predetermined communication protocol.

12. The method of claim 11, wherein the predetermined communication protocol includes a connection-oriented protocol.

13. The method of claim 11, wherein the predetermined communication protocol includes TCP.

14. The method of claim 9, wherein checking the integrity of the secure object handle further includes:

computing, by the kernel, a temporary variable, comparing the computed temporary variable to the signature in the secure object handle received from the client, and disallowing access to the data by the client in response to the computed temporary variable not matching the signature.

15. A non-transitory computer-readable medium storing executable instructions to enable communication of data from a kernel of an operating system to a client that, in response to being executed, cause a computer to perform operations comprising:

providing a context object that includes the data to be accessible to the client;

providing the kernel with a secure object handle, the secure object handle including an actual address of the context object and being particular to the context object;

sending, by the kernel, the secure object handle to the client over a bidirectional interface;

receiving, by the kernel, the secure object handle from the client over the bidirectional interface, indicating that the client requires access to the data in the context object, and checking an integrity of the secure object handle in the kernel and allowing access to the data by the client in response to the integrity check being successful.

* * * * *